United States Patent
Speter et al.

(10) Patent No.: US 10,842,124 B2
(45) Date of Patent: Nov. 24, 2020

(54) ANIMAL CONTAINMENT ENRICHMENT COMPOSITIONS AND METHODS

(71) Applicant: Innovive, Inc., San Diego, CA (US)

(72) Inventors: Gilles Speter, San Diego, CA (US); Leroy Jenson, La Mesa, CA (US)

(73) Assignee: INNOVIVE, INC., San Diego, CA (US)

(*) Notice: Subject to any disclaimer, the term of this patent is extended or adjusted under 35 U.S.C. 154(b) by 429 days.

(21) Appl. No.: 15/326,431

(22) PCT Filed: Jul. 15, 2015

(86) PCT No.: PCT/US2015/040647
§ 371 (c)(1),
(2) Date: Jan. 13, 2017

(87) PCT Pub. No.: WO2016/014319
PCT Pub. Date: Jan. 28, 2016

(65) Prior Publication Data
US 2017/0202176 A1 Jul. 20, 2017

Related U.S. Application Data

(60) Provisional application No. 62/108,472, filed on Jan. 27, 2015, provisional application No. 62/029,359, filed on Jul. 25, 2014.

(51) Int. Cl.
*A01K 1/015* (2006.01)
*A01K 1/00* (2006.01)

(52) U.S. Cl.
CPC .......... *A01K 1/0157* (2013.01); *A01K 1/0035* (2013.01); *A01K 1/0152* (2013.01); *A01K 1/0155* (2013.01)

(58) Field of Classification Search
USPC ........ 119/480, 28.5, 347, 471, 169–173, 706
See application file for complete search history.

(56) References Cited

U.S. PATENT DOCUMENTS 405,412 A * 6/1889 Hicks
453,003 A * 5/1891 Hicks
(Continued)

FOREIGN PATENT DOCUMENTS

EP 0160336 11/1985
EP 0233134 8/1987
(Continued)

OTHER PUBLICATIONS

The Squirrel Board, 10 pages, [retrieved from the Internet Jul. 28, 2020 https://thesquirrelboard.com/forums/showthread.php?7574-Best-Nest-Box-Material&s= 8d0a5646a52796b9c2d30a4f5bd80170] posts date from 2006 to 2007.*
(Continued)

*Primary Examiner* — Andrea M Valenti
(74) *Attorney, Agent, or Firm* — Grant IP, Inc.

(57) ABSTRACT

Provided herein are compositions and methods that facilitate animal enrichment and breeding in animal containment environments. Provided in certain embodiments are animal containment enrichment compositions that include one or more sheets, where at least one of the one or more sheets comprises an array of scores defining a flat array of strips in the sheet. Provided in certain embodiments are animal containment enrichment compositions that include one or more sheets, where at least one of the one or more sheets comprises an array of scores defining a flat array of sections of the sheet.

15 Claims, 5 Drawing Sheets

(56) References Cited

U.S. PATENT DOCUMENTS

| | | |
|---|---|---|
| 513,557 A | 1/1894 | Cobb |
| 1,909,611 A | 5/1933 | Charavay |
| 2,554,086 A | 5/1951 | Block |
| 2,988,044 A | 6/1961 | Adelberg et al. |
| 3,002,492 A | 10/1961 | Naturale |
| 3,084,850 A | 4/1963 | Engalitcheff, Jr. |
| 3,087,458 A | 4/1963 | Bennett |
| 3,096,933 A | 7/1963 | Bora |
| 3,122,127 A | 2/1964 | Shechmeister et al. |
| 3,127,872 A | 4/1964 | Finkel |
| 3,163,149 A | 12/1964 | Ivey |
| 3,212,474 A | 10/1965 | Higgins et al. |
| 3,225,738 A | 12/1965 | Palencia |
| 3,302,615 A | 2/1967 | Tietje |
| 3,334,614 A | 8/1967 | Gass et al. |
| 3,397,676 A | 8/1968 | Barney |
| 3,465,722 A | 9/1969 | Duff |
| 3,500,831 A | 3/1970 | Schaar |
| 3,518,971 A | 7/1970 | Gass et al. |
| 3,524,431 A | 8/1970 | Graham et al. |
| 3,537,428 A | 11/1970 | Montgomery |
| 3,547,309 A | 12/1970 | Pusey et al. |
| 3,649,464 A | 3/1972 | Feeman |
| 3,662,713 A | 5/1972 | Sachs |
| 3,698,360 A | 10/1972 | Rubricius |
| 3,718,120 A | 2/1973 | Schwarz |
| 3,731,657 A | 5/1973 | Alessio |
| 3,765,374 A | 10/1973 | Kolste |
| 3,768,546 A | 10/1973 | Shipes |
| 3,771,686 A | 11/1973 | Brison |
| 3,776,195 A | 12/1973 | Willinger |
| 3,791,346 A | 2/1974 | Willinger et al. |
| 3,924,571 A | 12/1975 | Holman |
| 3,958,534 A | 5/1976 | Perkins |
| 3,965,865 A | 6/1976 | Kundikoff |
| 3,978,818 A | 9/1976 | Heldenbrand |
| 4,022,159 A | 5/1977 | Salvia |
| 4,023,529 A | 5/1977 | Landy |
| 4,043,256 A | 8/1977 | VanHuis |
| 4,075,618 A | 2/1978 | Montean |
| 4,161,159 A | 7/1979 | Leong |
| 4,177,761 A | 12/1979 | Bellocchi, Jr. |
| 4,252,080 A | 2/1981 | Gioia et al. |
| 4,343,261 A | 8/1982 | Thomas |
| 4,365,590 A | 12/1982 | Ruggieri et al. |
| 4,367,728 A | 1/1983 | Mutke |
| 4,402,280 A | 9/1983 | Thomas |
| 4,448,150 A | 5/1984 | Catsimpoolas |
| 4,457,964 A * | 7/1984 | Kaminstein ........ A47G 23/0303 428/131 |
| 4,480,587 A | 11/1984 | Sedlacek |
| 4,528,941 A | 7/1985 | Spengler |
| 4,551,311 A | 11/1985 | Lorenz |
| 4,593,650 A | 6/1986 | Lattuada |
| 4,617,215 A * | 10/1986 | Telesco ............. A47G 23/0303 283/105 |
| 4,640,228 A | 2/1987 | Sedlacek et al. |
| 4,690,100 A | 9/1987 | Thomas |
| 4,699,088 A | 10/1987 | Murray et al. |
| 4,699,188 A | 10/1987 | Baker et al. |
| 4,728,006 A | 3/1988 | Drobish et al. |
| 4,774,631 A | 9/1988 | Okuyama et al. |
| 4,779,566 A | 10/1988 | Morris et al. |
| 4,784,083 A * | 11/1988 | Kiel ..................... A01K 1/0107 119/165 |
| 4,798,171 A | 1/1989 | Peters et al. |
| 4,818,579 A * | 4/1989 | Uchida .................... C02F 3/10 112/429 |
| 4,844,018 A | 7/1989 | Niki |
| 4,892,209 A | 1/1990 | Dorfman et al. |
| 4,907,536 A | 3/1990 | Chrisler |
| 4,940,017 A | 7/1990 | Niki et al. |
| 4,941,431 A | 7/1990 | Anderson et al. |
| 4,976,219 A | 12/1990 | Goguen et al. |
| 4,991,635 A | 2/1991 | Ulm |
| 5,000,120 A | 3/1991 | Coiro, Sr. et al. |
| 5,003,922 A | 4/1991 | Niki et al. |
| 5,031,515 A | 7/1991 | Niemela et al. |
| 5,044,316 A | 9/1991 | Thomas |
| 5,048,459 A | 9/1991 | Niki et al. |
| 5,053,262 A * | 10/1991 | Kerr ...................... A47G 19/10 248/206.4 |
| 5,081,955 A | 1/1992 | Yoneda et al. |
| 5,082,707 A * | 1/1992 | Fazio .................... A47G 9/062 428/43 |
| 5,148,766 A | 9/1992 | Coiro, Sr. et al. |
| 5,163,380 A | 11/1992 | Duffy |
| 5,165,362 A | 11/1992 | Sheaffer et al. |
| 5,213,059 A | 5/1993 | Krantz |
| 5,287,414 A | 2/1994 | Foster |
| 5,307,757 A | 5/1994 | Coiro, Sr. et al. |
| 5,316,172 A | 5/1994 | Apps et al. |
| 5,328,049 A | 7/1994 | Ritzow |
| 5,331,920 A | 7/1994 | Coiro, Sr. et al. |
| 5,349,923 A | 9/1994 | Sheaffer et al. |
| 5,385,118 A | 1/1995 | Coiro, Sr. et al. |
| 5,400,744 A | 3/1995 | Coiro, Sr. et al. |
| 5,407,129 A | 4/1995 | Carey et al. |
| 5,407,648 A | 4/1995 | Allen et al. |
| 5,429,800 A | 7/1995 | Miraldi et al. |
| 5,447,118 A | 9/1995 | Huff |
| 5,471,950 A | 12/1995 | White |
| 5,474,024 A | 12/1995 | Hallock |
| 5,513,596 A | 5/1996 | Coiro, Sr. et al. |
| 5,567,364 A | 10/1996 | Phillips |
| 5,572,403 A | 11/1996 | Mills |
| 5,572,953 A | 11/1996 | Phelan et al. |
| 5,605,240 A | 2/1997 | Guglielmini |
| 5,608,209 A | 3/1997 | Matsuda |
| 5,624,037 A | 4/1997 | Kozo |
| 5,635,403 A | 6/1997 | Bailey |
| 5,655,478 A | 8/1997 | Kiera |
| 5,657,891 A | 8/1997 | Bilani et al. |
| 5,664,704 A | 9/1997 | Meadows et al. |
| 5,694,885 A | 12/1997 | Deitrich et al. |
| 5,704,566 A * | 1/1998 | Schutz .................. A47K 10/16 242/160.1 |
| 5,706,761 A | 1/1998 | Mayer |
| 5,712,012 A * | 1/1998 | Forman .............. A47G 23/0303 428/195.1 |
| 5,717,202 A | 2/1998 | Matsuda |
| 5,745,041 A | 4/1998 | Moss |
| 5,771,841 A | 6/1998 | Boor |
| 5,780,130 A | 7/1998 | Hansen et al. |
| 5,797,350 A | 8/1998 | Smith |
| 5,823,144 A | 10/1998 | Edstrom et al. |
| 5,832,876 A | 11/1998 | Brown et al. |
| 5,865,144 A | 2/1999 | Semenuk |
| 5,893,338 A | 4/1999 | Campbell |
| 5,894,816 A | 4/1999 | Coiro, Sr. et al. |
| 5,905,653 A | 5/1999 | Higham |
| 5,915,332 A | 6/1999 | Young |
| 5,924,384 A | 7/1999 | Detrich et al. |
| 5,954,013 A | 9/1999 | Gabriel et al. |
| 5,954,237 A | 9/1999 | Lampe et al. |
| 5,996,535 A | 12/1999 | Semenuk et al. |
| 6,010,090 A * | 1/2000 | Bushmaker ............ B65H 35/04 162/114 |
| 6,021,042 A | 2/2000 | Anderson et al. |
| 6,029,604 A | 2/2000 | de Vosjoli |
| 6,092,487 A | 7/2000 | Niki et al. |
| 6,112,701 A | 9/2000 | Faith et al. |
| 6,138,610 A | 10/2000 | Niki |
| 6,142,732 A | 11/2000 | Chou et al. |
| 6,144,300 A | 11/2000 | Dames |
| 6,158,387 A | 12/2000 | Gabriel et al. |
| 6,164,311 A | 12/2000 | Momont |
| 6,217,437 B1 | 4/2001 | Murray et al. |
| 6,227,146 B1 | 5/2001 | Gabriel et al. |
| 6,237,800 B1 | 5/2001 | Barrett |
| 6,257,171 B1 | 7/2001 | Rivard |
| 6,293,227 B1 | 9/2001 | Ver Hage |
| 6,295,826 B1 | 10/2001 | Lee |
| 6,295,950 B1 | 10/2001 | Deitrich et al. |

(56) References Cited

U.S. PATENT DOCUMENTS

| | | | |
|---|---|---|---|
| 6,302,059 B1 | 10/2001 | Faith et al. | |
| 6,305,324 B1 | 10/2001 | Hallock et al. | |
| 6,308,660 B1 | 10/2001 | Coiro, Sr. et al. | |
| 6,311,644 B1 | 11/2001 | Pugh | |
| 6,336,427 B1 | 1/2002 | Gabriel et al. | |
| 6,341,581 B1 | 1/2002 | Gabriel et al. | |
| 6,357,393 B1 | 3/2002 | Coiro, Sr. et al. | |
| 6,361,962 B1 | 3/2002 | Lentini et al. | |
| 6,392,872 B1 | 5/2002 | Doustou et al. | |
| 6,394,032 B1 | 5/2002 | Coiro, Sr. et al. | |
| 6,396,688 B1 | 5/2002 | Davies et al. | |
| 6,407,918 B1 | 6/2002 | Edmunds et al. | |
| 6,408,794 B1 | 6/2002 | Coiro, Sr. et al. | |
| 6,423,118 B1 | 7/2002 | Becerra et al. | |
| 6,427,958 B1 | 8/2002 | Looney | |
| 6,457,437 B1 | 10/2002 | Frasier et al. | |
| 6,460,486 B1 | 10/2002 | Powers | |
| 6,463,397 B1 | 10/2002 | Cohen | |
| 6,517,428 B1 | 2/2003 | Murray et al. | |
| 6,532,897 B1* | 3/2003 | Adolfsson | A01K 1/0125 |
| | | | 119/168 |
| 6,532,901 B2 | 3/2003 | Isley | |
| 6,543,387 B1 | 4/2003 | Stein | |
| 6,553,939 B1 | 4/2003 | Austin et al. | |
| 6,556,437 B1 | 4/2003 | Hardin | |
| 6,561,129 B1 | 5/2003 | Cheng | |
| 6,571,738 B2 | 6/2003 | Rivard | |
| 6,572,819 B1 | 6/2003 | Wu et al. | |
| 6,584,936 B2 | 7/2003 | Rivard | |
| 6,588,373 B1 | 7/2003 | Strzempko et al. | |
| 6,592,448 B1 | 7/2003 | Williams | |
| 6,612,260 B1 | 9/2003 | Loyd et al. | |
| 6,714,121 B1 | 3/2004 | Moore | |
| 6,718,912 B2 | 4/2004 | Pappas | |
| 6,729,266 B1 | 5/2004 | Gabriel et al. | |
| 6,739,846 B2 | 5/2004 | Stoddard et al. | |
| 6,810,833 B2 | 11/2004 | Bonner et al. | |
| 6,813,152 B2 | 11/2004 | Perazzo | |
| 6,853,946 B2 | 2/2005 | Cohen et al. | |
| 6,878,874 B2 | 4/2005 | Osborn et al. | |
| 6,976,451 B2* | 12/2005 | Helfman | A01K 1/0107 |
| | | | 119/169 |
| 6,998,980 B2 | 2/2006 | Ingley, III | |
| 7,031,157 B2 | 4/2006 | Horng et al. | |
| 7,086,350 B2 | 8/2006 | Tecott | |
| 7,114,463 B2 | 10/2006 | Donohoe | |
| 7,126,471 B2 | 10/2006 | Ahmed | |
| 7,131,398 B2 | 11/2006 | Cohen et al. | |
| 7,146,931 B2 | 12/2006 | Gabriel et al. | |
| 7,191,734 B2 | 3/2007 | Strzempko et al. | |
| 7,237,509 B2 | 7/2007 | Bonner | |
| 7,320,294 B2 | 1/2008 | Irwin et al. | |
| 7,389,744 B2 | 6/2008 | Zhang | |
| 7,487,744 B1 | 2/2009 | Goldberg et al. | |
| 7,527,020 B2 | 5/2009 | Conger | |
| 7,665,419 B2 | 2/2010 | Conger et al. | |
| 7,734,381 B2 | 6/2010 | Conger et al. | |
| 7,739,984 B2 | 6/2010 | Conger | |
| 7,874,268 B2 | 1/2011 | Conger et al. | |
| 7,887,146 B1 | 2/2011 | Louie et al. | |
| 7,913,650 B2 | 3/2011 | Conger | |
| 7,954,455 B2 | 6/2011 | Conger | |
| 7,970,495 B2 | 6/2011 | Conger et al. | |
| 7,970,496 B2 | 6/2011 | Conger et al. | |
| 8,082,885 B2 | 12/2011 | Conger et al. | |
| 8,156,899 B2 | 4/2012 | Conger et al. | |
| 8,171,887 B2 | 5/2012 | Conger et al. | |
| 8,443,725 B2* | 5/2013 | McNeil | B41J 3/407 |
| | | | 101/24 |
| 8,499,719 B2 | 8/2013 | Brocca et al. | |
| 8,739,737 B2 | 6/2014 | Conger et al. | |
| 8,852,717 B2* | 10/2014 | Davis | A01K 1/0107 |
| | | | 428/138 |
| 10,005,197 B2* | 6/2018 | Kien | B26F 1/14 |
| 2001/0054394 A1 | 12/2001 | Marchioro | |
| 2002/0022991 A1 | 2/2002 | Sharood et al. | |
| 2002/0094283 A1 | 7/2002 | Salmen et al. | |
| 2002/0100429 A1 | 8/2002 | Wade | |
| 2002/0180588 A1 | 12/2002 | Erickson et al. | |
| 2002/0190845 A1 | 12/2002 | Moore | |
| 2002/0195060 A1 | 12/2002 | Dollahan | |
| 2003/0051676 A1 | 3/2003 | Rivard | |
| 2003/0130809 A1 | 7/2003 | Cohen et al. | |
| 2003/0131802 A1 | 7/2003 | Murray et al. | |
| 2003/0170145 A1 | 9/2003 | Smith et al. | |
| 2003/0200933 A1 | 10/2003 | Park | |
| 2004/0018105 A1 | 1/2004 | Stoddard et al. | |
| 2004/0185770 A1 | 9/2004 | Soeholm et al. | |
| 2004/0191437 A1 | 9/2004 | Asayama et al. | |
| 2004/0211745 A1 | 10/2004 | Murray | |
| 2004/0261727 A1 | 12/2004 | Matsuo et al. | |
| 2005/0009425 A1* | 1/2005 | Foote | A01K 1/0107 |
| | | | 442/57 |
| 2005/0024211 A1 | 2/2005 | Maloney | |
| 2005/0066908 A1 | 3/2005 | Park | |
| 2005/0076852 A1 | 4/2005 | Campiotti et al. | |
| 2005/0145191 A1 | 7/2005 | Cohen et al. | |
| 2005/0166860 A1 | 8/2005 | Austin et al. | |
| 2005/0193957 A1 | 9/2005 | Oshima et al. | |
| 2005/0241591 A1 | 11/2005 | Ingley, III | |
| 2005/0256591 A1 | 11/2005 | Rule et al. | |
| 2006/0000422 A1 | 1/2006 | Cheng | |
| 2006/0011143 A1 | 1/2006 | Drummond et al. | |
| 2006/0071774 A1 | 4/2006 | Brown et al. | |
| 2006/0111680 A1 | 5/2006 | Spada et al. | |
| 2006/0124072 A1 | 6/2006 | Conger | |
| 2006/0185614 A1 | 8/2006 | Van Fleet, Jr. | |
| 2006/0236951 A1 | 10/2006 | Gabriel et al. | |
| 2006/0254528 A1 | 11/2006 | Malnait et al. | |
| 2006/0278171 A1 | 12/2006 | Conger et al. | |
| 2007/0011950 A1 | 1/2007 | Wood | |
| 2007/0040682 A1 | 2/2007 | Zhu et al. | |
| 2007/0044799 A1 | 3/2007 | Hete et al. | |
| 2007/0159040 A1 | 7/2007 | Fernandez et al. | |
| 2007/0169714 A1 | 7/2007 | Conger et al. | |
| 2007/0169715 A1 | 7/2007 | Conger et al. | |
| 2007/0169716 A1 | 7/2007 | Conger et al. | |
| 2007/0169717 A1 | 7/2007 | Conger et al. | |
| 2007/0169718 A1 | 7/2007 | Conger et al. | |
| 2007/0175399 A1 | 8/2007 | Conger et al. | |
| 2007/0175404 A1 | 8/2007 | Conger et al. | |
| 2007/0181070 A1 | 8/2007 | Conger et al. | |
| 2007/0181074 A1 | 8/2007 | Conger et al. | |
| 2007/0181075 A1 | 8/2007 | Conger et al. | |
| 2007/0193527 A1 | 8/2007 | Verhage et al. | |
| 2007/0209653 A1 | 9/2007 | Beisheim et al. | |
| 2007/0256643 A1 | 11/2007 | Coiro et al. | |
| 2008/0066688 A1 | 3/2008 | Malnati et al. | |
| 2008/0078332 A1 | 4/2008 | Conger et al. | |
| 2008/0087231 A1 | 4/2008 | Gabriel et al. | |
| 2008/0110404 A1 | 5/2008 | Theis et al. | |
| 2008/0115733 A1* | 5/2008 | Johnes | A01K 1/0155 |
| | | | 119/172 |
| 2008/0134984 A1 | 6/2008 | Conger et al. | |
| 2008/0222565 A1 | 9/2008 | Taylor et al. | |
| 2008/0236504 A1* | 10/2008 | Silverman | A01K 1/0107 |
| | | | 119/169 |
| 2008/0236506 A1 | 10/2008 | Conger et al. | |
| 2008/0236507 A1 | 10/2008 | Conger et al. | |
| 2008/0282990 A1 | 11/2008 | Conger et al. | |
| 2009/0002496 A1 | 1/2009 | Esmaeili | |
| 2009/0293815 A1 | 12/2009 | Coiro et al. | |
| 2010/0006521 A1 | 1/2010 | VerHage et al. | |
| 2010/0154716 A1* | 6/2010 | Smith | A01K 1/0107 |
| | | | 119/169 |
| 2010/0176144 A1* | 7/2010 | Askinasi | A01K 1/0107 |
| | | | 221/71 |
| 2010/0242852 A1 | 9/2010 | Conger | |
| 2010/0248611 A1 | 9/2010 | Conger | |
| 2011/0005465 A1 | 1/2011 | Tamborini et al. | |
| 2011/0041773 A1 | 2/2011 | Brielmeier et al. | |
| 2011/0061600 A1 | 3/2011 | Conger et al. | |
| 2011/0139082 A1* | 6/2011 | Blagden | A01K 1/0107 |
| | | | 119/171 |

(56) References Cited

U.S. PATENT DOCUMENTS

| | | |
|---|---|---|
| 2011/0297098 A1 | 12/2011 | Conger et al. |
| 2011/0303158 A1 | 12/2011 | Conger et al. |
| 2011/0308475 A1 | 12/2011 | Conger et al. |
| 2012/0000428 A1* | 1/2012 | Keating .................. A01K 1/015 119/28.5 |
| 2012/0085291 A1 | 4/2012 | Conger et al. |
| 2012/0318207 A1 | 12/2012 | Conger et al. |
| 2013/0160716 A1 | 6/2013 | Conger et al. |
| 2013/0220229 A1 | 8/2013 | Conger et al. |
| 2013/0228134 A1 | 9/2013 | Conger et al. |
| 2013/0269624 A1* | 10/2013 | Ryu ..................... A01K 1/0107 119/171 |
| 2013/0284109 A1 | 10/2013 | Conger et al. |
| 2014/0014043 A1* | 1/2014 | McCann .............. A01K 15/024 119/706 |
| 2014/0069340 A1 | 3/2014 | Lipscomb |
| 2014/0123906 A1 | 5/2014 | Conger et al. |
| 2014/0196666 A1* | 7/2014 | Kuzniar ............... A01K 1/0107 119/479 |
| 2014/0345536 A1 | 11/2014 | Usui et al. |
| 2015/0359189 A1 | 12/2015 | Bernardini |
| 2016/0037744 A1 | 2/2016 | Rudin |
| 2016/0270365 A1 | 9/2016 | Conger et al. |

FOREIGN PATENT DOCUMENTS

| | | |
|---|---|---|
| EP | 0279076 | 12/1987 |
| FR | 2696423 A1 | 4/1994 |
| FR | 2824703 A1 | 11/2002 |
| GB | 1553039 A | 9/1979 |
| GB | 2292150 A | 2/1996 |
| JP | 56-3770 | 1/1981 |
| JP | S56-54772 | 12/1981 |
| JP | 57-083233 | 5/1982 |
| JP | 62-7852 | 1/1987 |
| JP | 64-85026 | 3/1989 |
| JP | 03-244330 | 10/1991 |
| JP | 4-9555 | 1/1992 |
| JP | 4-023929 | 1/1992 |
| JP | 4-267826 | 9/1992 |
| JP | 05005499 | 1/1993 |
| JP | H06-068430 | 9/1994 |
| JP | 3022196 | 12/1995 |
| JP | 9-168346 | 6/1997 |
| JP | H10-215720 | 8/1998 |
| JP | 10-286037 | 10/1998 |
| JP | H11-009126 | 1/1999 |
| JP | 2000-032862 | 2/2000 |
| JP | 3070623 | 8/2000 |
| JP | 2002-065109 | 3/2002 |
| JP | 2003-088263 | 3/2003 |
| JP | 2003-018932 | 7/2003 |
| JP | 2003-239166 | 8/2003 |
| JP | 2004-001373 | 1/2004 |
| JP | 2004-114673 | 4/2004 |
| JP | 2005-095004 | 4/2005 |
| JP | 2005-185189 | 7/2005 |
| JP | 2005-328725 | 12/2005 |
| JP | 2008-527975 | 7/2008 |
| JP | 2009-529862 | 8/2009 |
| JP | 2010-523158 | 7/2010 |
| WO | WO 92/018084 | 10/1992 |
| WO | WO 93/014474 | 7/1993 |
| WO | WO 95/08263 A1 | 3/1995 |
| WO | WO 96/17245 A1 | 6/1996 |
| WO | WO 96/36217 A1 | 11/1996 |
| WO | WO 01/091543 | 12/2001 |
| WO | WO 02/011523 | 2/2002 |
| WO | WO 03/051106 | 6/2003 |
| WO | WO 03/059048 | 7/2003 |
| WO | WO 2006/065773 | 6/2006 |
| WO | WO 2006/138323 | 12/2006 |
| WO | WO 2008/021492 | 2/2008 |
| WO | WO 08/127998 | 10/2008 |
| WO | WO 09/098617 | 8/2009 |
| WO | WO 2010/054257 | 5/2010 |
| WO | WO 2012/051124 | 4/2012 |
| WO | WO 2016/014319 | 7/2015 |

OTHER PUBLICATIONS

Gaskill, B.N. et al. Energy reallocation to breeding performance through improved nest building in laboratory mice. PLoS One Sep. 2013 vol. 8 (9):e.74153.

Gaskill, B.N. et al Nest Building as an indicator of health and Welfare in Laboraotry Mice. J. of Vis Exp. (2013) vol. 82: e.51012.

Hess, S.E. et al. Home Improvement: C57BL/6J Mice given more naturalistic Nesting Material build better nests. J. Am Assoc Lab Animal Sci Nov. 2008 vol. 47 (6) 25-31.

Latham, N et al, From house mouse to mouse house: the behavioural biology of free-living *Mus musculus* and its implications in the laboratory. Applied Animal Behavior Science (2004) vol. 86: 261-289.

Miyamoto et al. Utility of Recycled Bedding for Laboratory Rodents J. Am Assoc Lab Animal Sci. Jul. 2009 vol. 48 (4):405-411.

International Search Report and Written Opinion dated Apr. 5, 2016 as International Application No. PCT/US2015/040647, filed on Jul. 15, 2015 and published as WO 2016/014319 on Jan. 28, 2016.

International Preliminary Report on Patentability dated Feb. 9, 2017 in International Application No. PCT/US2015/040647, filed on Jul. 15, 2015 and published as WO 2016/014319 on Jan. 28, 2016.

* cited by examiner

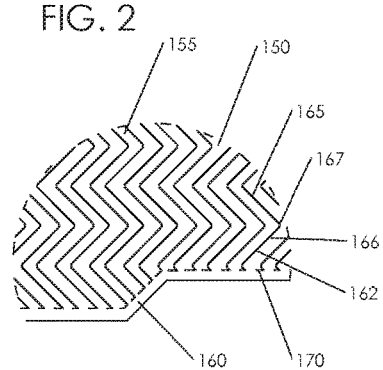
FIG. 2
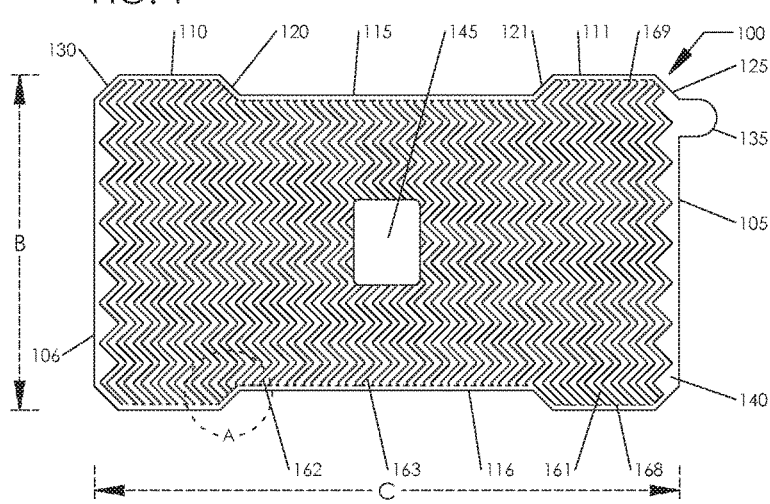
FIG. 1
FIG. 5
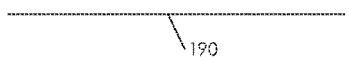
FIG. 4
FIG. 3
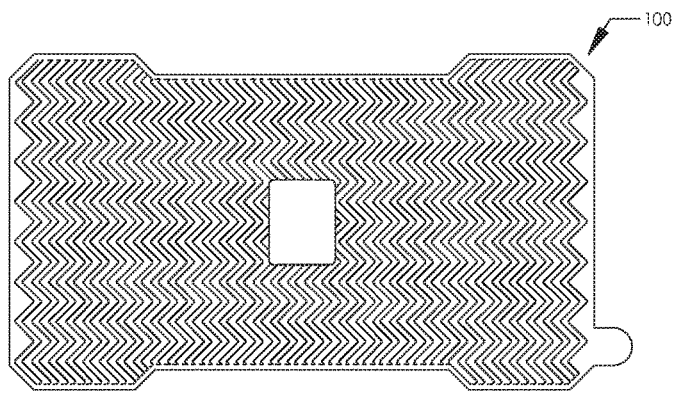

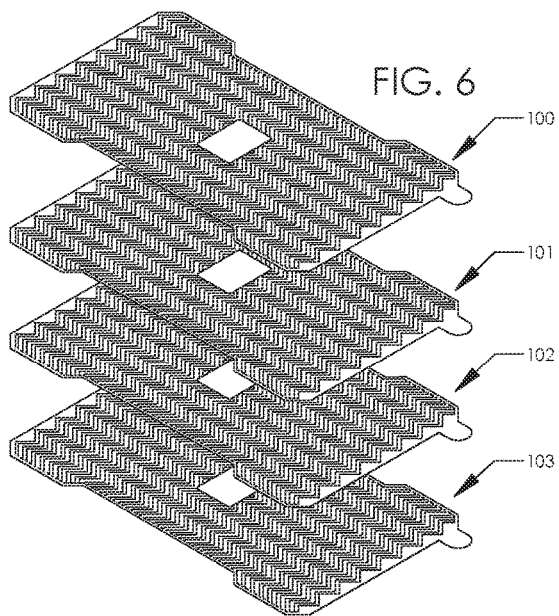
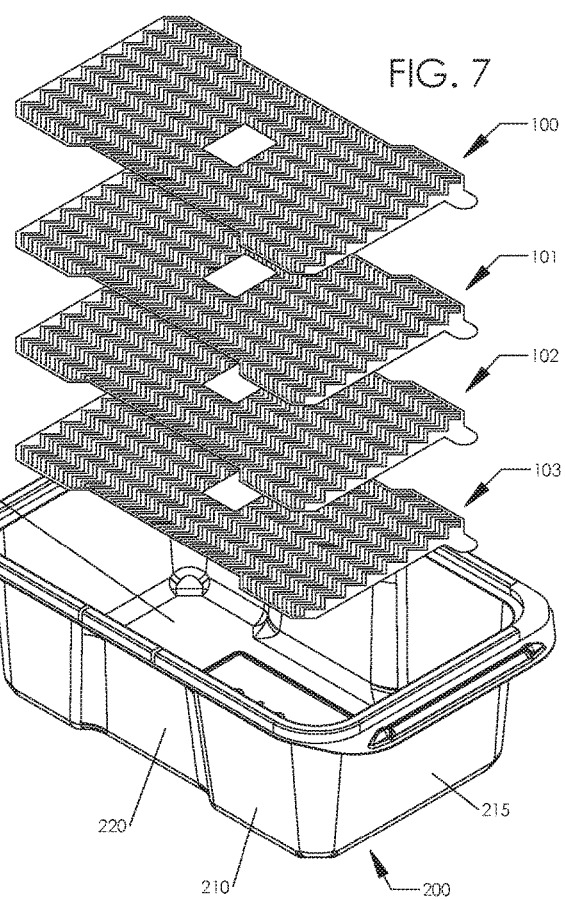
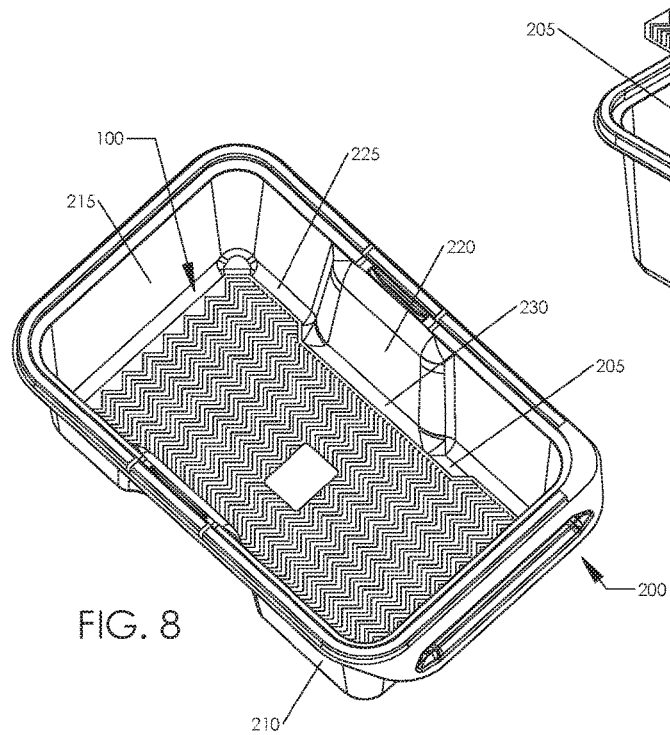

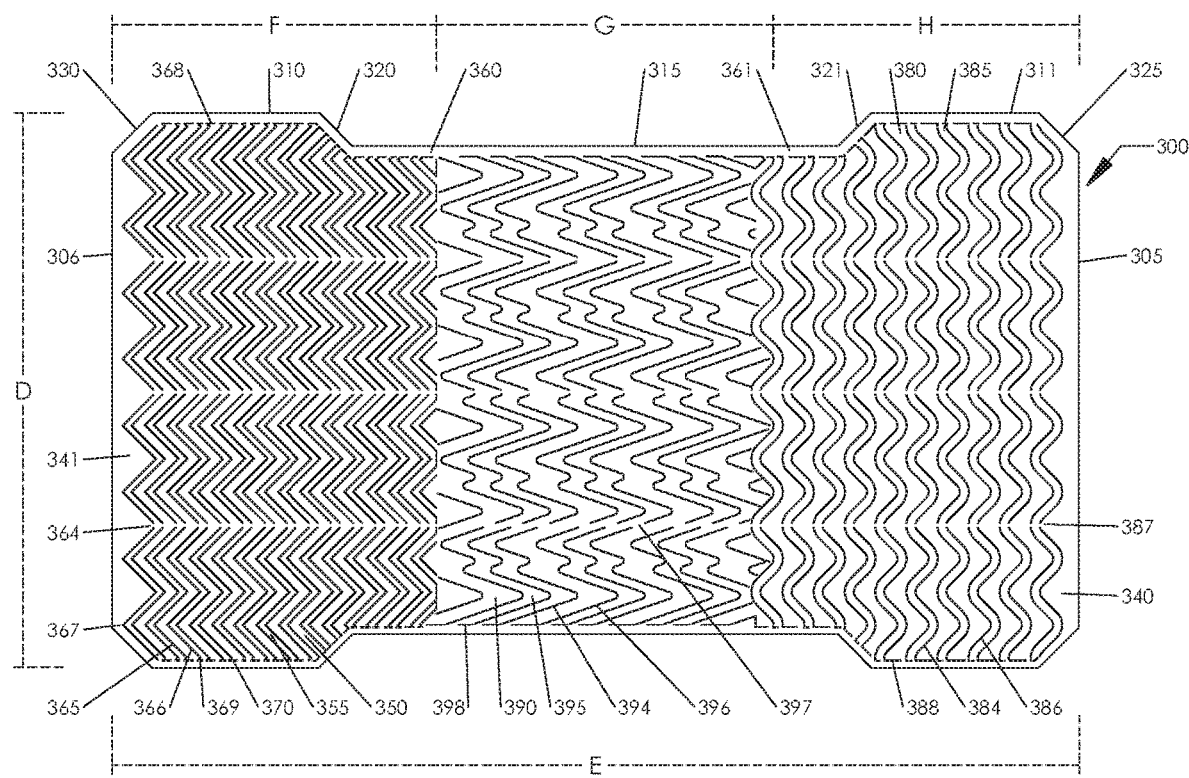

ANIMAL CONTAINMENT ENRICHMENT COMPOSITIONS AND METHODS

RELATED PATENT APPLICATIONS

This patent application is a 35 U.S.C 371 national phase patent application of PCT/US2015/040647, filed on Jul. 15, 2015, entitled ANIMAL CONTAINMENT ENRICHMENT COMPOSITIONS AND METHODS, naming Gilles Speter and Leroy Jenson as inventors, which claims the benefit of U.S. Provisional Patent Application No. 62/029,359 filed on Jul. 25, 2014, entitled ANIMAL CONTAINMENT ENRICHMENT COMPOSITIONS AND METHODS, naming Gilles Speter and Leroy Jenson as inventors. This application also claims the benefit of U.S. Provisional Patent Application No. 62/108,472, filed Jan. 27, 2015, entitled ANIMAL CONTAINMENT ENRICHMENT COMPOSITIONS AND METHODS, naming Gilles Speter and Leroy Jenson as inventors. Each of the foregoing patent applications is incorporated herein by reference in its entirety, including all text, tables and drawings.

FIELD

The technology relates in part to animal husbandry, and relates in part to compositions and methods that provide enrichment to animals in animal containment environments.

BACKGROUND

Certain compositions can be provided to animals contained in a containment environment that improves their existence and thereby provides enrichment. Mice and other animals, for example, build nests in the wild. Such animals, when housed in a containment environment, can utilize several different types of materials to build nests. Mice, for example, can use shredded paper, paper towels, paper strips, commercial nesting fiber, wood shavings and wood wool to build nests in a containment environment when such materials are provided. Mice and other animals in a containment environment often require bedding material. Materials provided in a containment system that can be modified by contained animals are referred to herein generally as "enrichment compositions."

SUMMARY

Enrichment compositions can serve one or more of the following non-limiting functions: occupy contained animals, provide nesting materials for contained animals and provide bedding materials for contained animals. Enrichment compositions can provide material suitable for a variety of purposes depending on the pattern of scoring of the composition and the product that results from the modification of a composition by a contained animal. Enrichment compositions often combine an enrichment function with the provision of nesting materials or combine an enrichment function with the provision of bedding materials.

Provided in certain aspects are animal containment enrichment compositions that include one or more sheets, where at least one of the one or more sheets includes an array of scores defining a flat array of strips in the sheet. The array of scores generally is configured for an animal in a containment system to remove strips in the array of strips from the sheet. The strips, after being removed from the sheet by an animal, typically are suitable for building a nest by one or more animals in the containment system.

Also provided in certain aspects are animal containment enrichment compositions that include one or more sheets, where at least one of the one or more sheets includes an array of scores defining a flat array of sections in the sheet. The array of scores generally is configured for an animal in a containment system to separate individual sections or groups of sections in the array from the sheet. An animal can further separate the groups of sections into individual sections. Separated and partially separated sections in a sufficient amount or mass are suitable for use as bedding material for one or more animals in a containment system.

Also provided in certain aspects are cage bases that include an animal containment enrichment composition or compositions (i.e., multiple sheets with the same or different scoring patterns) described herein. The cage base often comprises a bottom and the enrichment composition or compositions often are in contact with the bottom. A cage base can be provided in a nested set of cage bases, and each of the cage bases in the nested set can include an animal containment enrichment composition or compositions described herein.

Provided also in certain aspects are methods for manufacturing an animal containment enrichment composition described herein that include (i) positioning a die comprising an array of blades in proximity with a surface of a solid sheet; and (ii) causing the array of blades of the die to penetrate the sheet; whereby the array of scores in the sheet is formed by the array of blades of the die. Provided in certain aspects are methods for manufacturing an animal containment enrichment composition described herein that include (i) positioning a heat source in proximity with a surface of a solid sheet; and (ii) causing the heat source to emit heat in an amount sufficient to penetrate the sheet at locations in the array of scores in the sheet.

Also provided in certain aspects are methods for preparing or maintaining a cage for animal containment that include affixing a cage lid to a cage base comprising an animal containment enrichment composition or compositions described herein, thereby providing an animal containment cage for animal containment.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

FIG. 1 is a top view of a sheet of an animal containment enrichment composition embodiment.

FIG. 2 is an enlarged view of detail A shown in FIG. 1.

FIG. 3 is a bottom view of the sheet embodiment shown in FIG. 1.

FIG. 4 is a side view of side C of the sheet embodiment shown in FIG. 1.

FIG. 5 is a side view of side B of the sheet embodiment shown in FIG. 1.

FIG. 6 is an exploded, top perspective view of four sheets of an animal containment enrichment composition embodiment.

FIG. 7 is an exploded, top perspective view of four sheets of an animal containment enrichment composition embodiment and a cage base embodiment.

FIG. 8 is a top perspective view of the four sheets shown in FIG. 7 in stacked arrangement and positioned on the cage base bottom.

FIG. 9 is a top view of a sheet of an animal containment enrichment composition embodiment that includes three sub-arrays of scores and strips (i.e., sub-arrays F, G and H).

Figure 10:
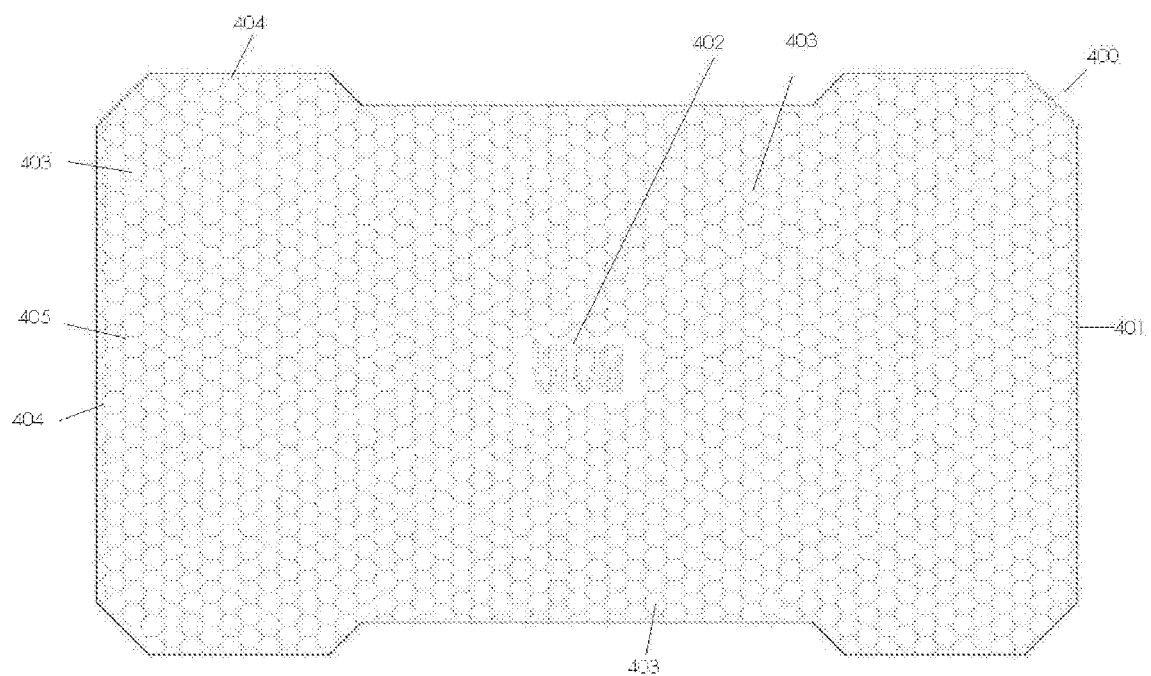
FIG. 10 is a top view of a sheet of an animal containment enrichment composition embodiment with an array of scores defining multiple sections that can be detached from the sheet and separated from each other.

A listing of certain elements called out in the drawings is provided for reference in the following table.

| Callout(s) | Element(s) |
|---|---|
| 100, 101, 102, 103, 300, 400 | sheet of an animal containment enrichment composition embodiment |
| 105, 106, 110, 111, 115, 116, 120, 121, 125, 130, 305, 306, 310, 311, 315, 320, 321, 325, 330, 401 | sheet perimeter |
| 135 | tab |
| 140, 160, 340, 341, 360, 361 | border |
| 145, 402 | solid panel |
| 150, 155, 350, 355 | strip: v-shaped zig-zag |
| 380, 385 | strip: s-shaped |
| 390, 395 | strip: arch-shaped |
| 161, 162 | score: continuous v-shaped zig-zag |
| 163 | score: discontinuous v-shaped zig-zag |
| 165, 166 | linear portion of a score |
| 365, 366 | score: discontinuous v-shaped zig-zag |
| 384, 386 | score: discontinuous s-shaped |
| 394, 396 | score: discontinuous arch-shaped |
| 168, 169, 368, 369 | score terminus |
| 170, 370, 388, 398 | counter-score |
| 167, 367 | apex |
| 364, 387, 397, | break in non-continuous (i.e., discontinuous) score |
| 190, 195 | sheet edge |
| 200 | cage base |
| 205 | cage base bottom |
| 210, 215 | cage base sidewall |
| 220 | sidewall detent |
| 225 | sidewall-to-bottom transition |
| 230 | detent-to-bottom transition |
| 403 | section |
| 404 | partial section |
| 405 | score |
| 406 | corner link |
| 407 | side link |
| 408 | full length linear score |
| 409 | partial length linear score |

DETAILED DESCRIPTION

Provided are animal containment enrichment compositions that include one or more sheets, where at least one of the one or more sheets includes an array of scores defining a flat array of strips in the sheet. An animal containment enrichment composition can provide enrichment to a contained animal in one or more of the following non-limiting manners.

An animal in a containment system can remove strips in an array of strips from a sheet, and may remove other components from a sheet (e.g., a solid panel and/or a border when such components are present in a sheet). The act of removing strips and other components from a sheet can occupy a contained animal and thereby provide enrichment.

An animal often can utilize strips and other components removed from a sheet to build a nest in a containment system. The act of building a nest and using a nest as shelter can provide enrichment to contained animals. For example, using a nest can stimulate breeding and enhance breeding by improving a contained animal's success in rearing offspring.

Strips and other components removed by a contained animal from a sheet can absorb animal excrement and contaminants, and provide enrichment by improving hygiene in a containment environment. Strips and other components removed by contained animals from a sheet also can improve hygiene by isolating contained animals from excrement and contaminants. For example, a contained animal may position strips and other components from a sheet over and/or around excrement and contaminants, thereby isolating excrement and contaminants from other portions of a containment environment occupied by animals.

A contained animal also can utilize strips and other components removed from a sheet to regulate body temperature and thereby enrich its environment. Containment systems often are ventilated (e.g., individually ventilated caging (IVC)) and ventilation can reduce the temperature of a containment environment. Contained animals may compensate for such reduced temperature by surrounding themselves with strips and other components removed from a sheet, which can serve to retain body heat.

Also provided are animal containment enrichment compositions that include one or more sheets, where at least one of the one or more sheets includes an array of scores defining a flat array of sections in the sheet. The animal containment composition can be placed in the interior of the base of a cage. Such an animal containment enrichment composition can provide bedding for an animal or animals contained in the cage once a sufficient number of sections are accumulated and distributed in a cage (sufficient volume or depth of sections). An animal can detach sections from the composition and separate sections by tearing the links between the sections of the composition. The sections can be distributed throughout the bottom of the base of a cage by an animal that intentionally moves sections (carries or pushes sections) or by displacement of sections that results from the movement of an animal or animals in the cage. The amount of bedding material required depends, among other things, on the species of animal, the number of animals in a cage, the size of the cage base and the frequency of cleaning. Bedding materials derived from an animal containment enrichment composition can also facilitate drying of bedding and dispersion of ammonia as contained animals continue to move sections of the material around the cage even after sections are separated. Such an animal containment enrichment composition can also provide one or more of the above-described enrichment functions for a contained animal or animals. For example, the act of removing sections from a sheet of an animal containment composition can occupy a contained animal and thereby provide enrichment. The environment of a contained animal environment can also be enriched. Sections of bedding material can absorb animal excrement and contaminants or be positioned by an animal to cover or segregate excrement and contaminants. Sections can also be used by a contained animal or animals for burrowing to regulate body temperature and retain body heat.

Accordingly, compositions provided herein often are referred to generally as "enrichment compositions," and can be referred to as "nesting compositions" should one or more contained animals utilize the compositions to build a nest or can be referred to as "bedding compositions" should one or more contained animals utilize the compositions for bedding. Certain features of animal containment enrichment compositions are described hereafter.

Enrichment Composition Components

An animal containment enrichment composition often includes one or more sheets. A sheet in an enrichment composition can include strips, which are defined by an array of scores (e.g., array of perforations, array of cuts), and which are arranged in the sheet as a flat array of strips. The flat array of strips sometimes is a planar array of strips or a substantially planar array of strips. A substantially planar array of strips generally deviates from planar by about four millimeters or less (e.g., about 3 millimeters, 2 millimeters, 1 millimeter or less), measured ninety degrees from the sheet surface independently from each side of the sheet.

An animal may remove each strip from an array of strips in a sheet independently (i.e., one-by-one strip removal) and/or may remove multiple strips from the array as a group of strips. The shape of each piece removed from a sheet (e.g., strip) typically is defined by scores and/or scoring patterns in the sheet, and sometimes by counter-scores when present in a sheet (discussed hereafter). Removing strips defined by scores from a sheet differs from removing patches or clumps not defined by scores in a sheet material not having scores. A scoring pattern in the array of strips typically results in a contained animal removing regular or substantially regular strips or groups of strips. This regularity in the pieces (e.g., strips, solid panel, border) removed is in contrast to an animal removing patches or clumps of generally random shape and size from a material that does not define the removed pieces by a scoring pattern.

A sheet can include any suitable scoring pattern in an array of strips. In certain embodiments, the shape of each of the strips in the array of strips is the same in a sheet. In some embodiments, the shape of two or more strips in the array of strips is different in a sheet. A sheet can include any suitable number of strip shapes (e.g., one to about twenty different shapes of strips; e.g., about 2, 3, 4, 5, 6, 7, 8, 9, 10, 12, 14, 16, 18 different shapes of strips), and each different shape of strips can be grouped independently into a sub-array. In certain embodiments, strips having a first shape are grouped in a first sub-array of strips in the sheet and strips having a second shape are grouped in a second sub-array of strips in the sheet. Sometimes strips having a third shape are grouped in a third sub-array of strips in the sheet. Sub-arrays, when present in a sheet, can be organized on the sheet in any suitable manner. For example, sub-arrays can be arranged sequentially and side-by-side across a sheet (e.g., sub-arrays F, G and H in FIG. 9) or may be arranged in an array of sub-arrays. Any array of sub-arrays can be any suitable array, such as an X by Y array in which X sometimes is 2 to about 10 sub-arrays and Y can be independently 2 to about 10 sub-arrays.

The shape of each strip in an array or sub-array can be of any suitable shape that does not injure a contained animal, and often a shape used by an animal for nest building is selected. In some embodiments, the shape of one or more strips in an array or sub-array is chosen from linear, curved, s-shaped, sinusoidal, arched, arch-shaped (e.g., single arch structure, multiple arch structures), v-shaped, w-shaped, zig-zag and spiral-shaped. As scores in an array or sub-array generally define the shape of strips, the shape of one or more scores sometimes is chosen from linear, curved, s-shaped, sinusoidal, arched, arch-shaped (e.g., single arch structure, multiple arch structures), v-shaped, w-shaped, zig-zag and spiral-shaped, in some embodiments, scores defining opposite perimeters of a strip include linear scores and the linear scores sometimes are parallel (e.g., a strip can include one or more linear portions). In certain embodiments, a score includes adjacent linear portions, and the adjacent linear portions are at an angle to one another (e.g., an angle of about 10 degrees to about 170 degrees (e.g., an angle of about 20, 30, 40, 50, 60, 70, 80, 90, 100, 110, 120, 130, 140, 150, 160 degrees)). A score having adjacent linear portions in a sheet can include a uniform or substantially uniform angle between adjacent linear portions, or one or more different angles between different sets of adjacent linear portions. Scores in an array or sub-array having adjacent linear portions can include a uniform or substantially uniform angles between adjacent linear portions, or one or more different angles between adjacent linear portions.

A score sometimes is of a shape that includes one or more apexes at which two portions of a score having a different feature (e.g., different angle, different arc) meet. An apex sometimes is pointed (e.g., for a v-shaped or w-shaped score) and sometimes an apex is rounded (e.g., for curved, s-shaped, sinusoidal, arched, arch-shaped, spiral-shaped (e.g., single arch structure, multiple arch structures), non-pointed v-shaped, non-pointed w-shaped, non-pointed zig-zag shaped scores). A score sometimes includes only pointed apexes, sometimes only rounded apexes, and sometimes a combination of rounded and pointed apexes. An array or sub-array in a sheet sometimes includes scores having only pointed apexes, sometimes only rounded apexes, and sometimes a combination of rounded and pointed apexes. A rounded apex can be of any suitable radius of curvature, and sometimes has a radius of curvature of about 0.01 millimeters to about 10 millimeters (e.g., about 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8 or 9 millimeters radius of curvature). A score in a sheet can include uniform or substantially uniform rounded apexes, or one or more different rounded apexes having different radii of curvature. Scores in an array or sub-array can include uniform or substantially uniform rounded apexes, or one or more different rounded apexes having different radii of curvature.

A strip in a sheet sometimes has a uniform or substantially uniform width (for the latter, the width may deviate by 10% or less in the strip), and sometimes the width varies in a strip. The width of each of the strips in an array or a sub-array sometimes is the same or substantially the same in a sheet. In some embodiments, the width of strips in an array or a sub-array sometimes is different in a sheet. In certain embodiments, a sheet includes an array or two or three sub-arrays, and the array or sub-arrays have strips of one uniform width or strips of two different widths. For embodiments in which strips of an array or sub-array are of two different widths, strips of different widths often are adjacent and alternate (e.g., alternate repetitively) in the array or sub-array. In certain embodiments, a strip in a sheet independently has a maximum width of about 0.5 millimeters to about 30 millimeters (e.g., about 1 millimeter to about 5 millimeters; about 2 millimeters to about 5 millimeters; about 0.5, 0.6, 0.7, 0.8, 0.9, 1, 2, 3, 4, 5, 6, 7, 8 millimeters).

In some embodiments, one or more, a portion of, or all scores in an array or sub-array traverse the sheet thickness (i.e., penetrate the entire sheet thickness from one side of the sheet to the other side of the sheet). In certain embodiments, one or more, a portion of, or all scores in an array or sub-array partially traverse the sheet thickness (e.g., penetrate about 20% to about 90% of the sheet thickness (e.g., about 30%, 40%, 50%, 60%, 70%, 80% of the sheet thickness)).

In some embodiments, one or more, a portion of, or all scores in an array or sub-array of a sheet are continuous from the score terminus on one side of the sheet to the score terminus on an opposing side of the sheet. In some embodiments, one or more or all scores in an array or sub-array of a sheet are not continuous from the score terminus on one side of the sheet to the score terminus on an opposing side of the sheet. In the latter embodiments, a score that is not continuous is referred to as "discontinuous" and includes a break portion (e.g., a broken score) in which there is no score or a partial score. In some embodiments, (i) a sheet has one array, or two or more sub-arrays, and the scores in the array or the sub-arrays are continuous scores, (ii) a sheet has one array, or two or more sub-arrays, and the scores in the array or the sub-arrays are discontinuous scores and contain breaks that do not penetrate the thickness of the sheet, (iii) scores that traverse the entire thickness of the sheet, (iv) scores that do not traverse the entire thickness of the sheet, or (v) combinations of two or more of (i), (ii), (iii) and (iv). In some embodiments, a score in an array or sub-array has a length, measured from one score terminus to an opposite score terminus, of about 10 centimeters to about 20 centimeters (e.g., about 12 centimeters to about 15 centimeters; about 13 centimeters to about 14 centimeters; about 14 centimeters to about 17 centimeters; about 15 centimeters to about 16 centimeters; about 10, 11, 12, 13, 14, 15, 16, 17, 18, 19, 20, 22, 24, 26, 28, 30 centimeters).

In certain embodiments, one or more scores in an array or sub-array of a sheet are contiguous with, or are adjacent to a counter-score. A counter-score often is at an angle to the portion of the score with which it is contiguous or to which it is adjacent (e.g., at an angle of about 10 degrees to about 170 degrees (e.g., an angle of about 20, 30, 40, 50, 60, 70, 80, 90, 100, 110, 120, 130, 140, 150, 160 degrees)). A terminus of a counter-score sometimes is within about 2 millimeters (e.g., within about 1 millimeter, 0.5 millimeters, 0.25 millimeters) of the closest terminus of a score when the counter-score and the score are adjacent. A counter-score sometimes is about 0.10 millimeters to about 15 millimeters in length (e.g., about 0.2, 0.3, 0.4, 0.5, 0.6, 0.7, 0.8, 0.9, 1.0 1.1, 1.2, 1.3, 1.4, 1.5, 1.6, 1.7, 1.8, 1.9, 2.0, 2.2, 2.4, 2.5, 2.6, 2.8, 3.0, 3.5, 4.0, 4.5 millimeters in length).

A counter-score sometimes is parallel or substantially parallel to a sheet side (e.g., substantially parallel deviating 10 degrees or less from parallel with the sheet side perimeter), and a plurality of such counter-scores in an array or sub-array often defines, generally, a continuous border along a sheet perimeter. A border can be of any suitable shape and width. A sheet sometimes includes one border having a uniform or substantially uniform shape and width, and sometimes a sheet includes two or more borders having a different shape and/or a different width. A border sometimes has a maximum width of about 0.5 millimeters to about 5 millimeters (e.g., about 0.6, 0.7, 0.8, 0.9, 1.0 1.1, 1.2, 1.3, 1.4, 1.5, 1.6, 1.7, 1.8, 1.9, 2.0, 2.2, 2.4, 2.5, 2.6, 2.8, 3.0, 3.5, 4.0, 4.5 millimeters in width). The exterior side of a border often is co-extensive with a perimeter of a sheet (e.g., often linear), and the shape of the interior side of a border often is defined by the shape of a score or counter-score with which it is associated (e.g., linear, curved, s-shaped, sinusoidal, arched, arch-shaped (e.g., single arch structure, multiple arch structures), v-shaped, w-shaped, zig-zag and spiral-shaped). A score associated with a border often is a terminal score in an array or sub-array of scores. The width and/or shape of one or more or all borders in a sheet often is different than the width and/or shape of one or more or all strips in the sheet.

A sheet in an enrichment composition can include sections, which are defined by an array of scores (e.g., array of perforations, array of cuts), and which are arranged in the sheet as a flat array of sections. The flat array of sections sometimes is a planar array of sections or a substantially planar array of sections. A substantially planar array of sections generally deviates from planar by about four millimeters or less (e.g., about 3 millimeters, 2 millimeters, 1 millimeter or less), measured ninety degrees from the sheet surface independently from each side of the sheet.

An animal may remove each section from an array of sections in a sheet independently (i.e., removal of one individual section at a time) and/or may remove multiple sections from the array as a group of sections. An animal may separate the group of sections into individual sections. The shape of each section removed from a sheet, typically is defined by scores and/or scoring patterns in the sheet. Removing sections defined by scores from a sheet differs from removing patches or clumps not defined by scores in a sheet material not having scores. A scoring pattern in the array of sections typically results in a contained animal removing regular or substantially regular sections or groups of sections. This regularity in the pieces removed is in contrast to an animal removing patches or clumps of generally random shape and size from a material that does not define the removed pieces by a scoring pattern.

A sheet can include any suitable scoring pattern in an array of sections. The sections in an array can be repeated so that all or substantially all of a sheet contains sections or partial sections. The sections and partial sections can be contiguous throughout the sheet and can occupy the surface of a sheet. In certain embodiments, the shape of each of the sections in the array of sections in a sheet is the same shape. Sections can be geometric shapes or polygons including but not limited to triangles, squares rectangles, parallelograms, hexagons or octagons. The polygons can be regular or irregular. In some embodiments, the sections are regular hexagons (honeycomb shaped). In some embodiments, the shape of two or more sections in the array of sections is different in a sheet. Different shaped sections can be grouped into sub-arrays of sections of the same shape or the different shaped sections can be interspersed.

In certain embodiments, the area of a section is from about 1 $mm^2$ to about 500 $mm^2$; about 5 $mm^2$ to about 400 $mm^2$; about 10 $mm^2$ to about 200 $mm^2$; about 20 $mm^2$ to about 100 $mm^2$; about 25 $mm^2$ to about 50 $mm^2$ (e.g., about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 150, 200, 250, 300, 350, 400, 450 or 500 $mm^2$).

Scores in an array generally define the shape of sections. In some embodiments, scores include linear scores and the linear scores are sometimes parallel. In certain embodiments, a score includes adjacent linear portions, and the adjacent linear portions are at an angle to one another (e.g., an angle of about 10 degrees to about 170 degrees (e.g., an angle of about 20, 30, 40, 50, 60, 70, 80, 90, 100, 110, 120, 130, 140, 150, 160 degrees)). A score having adjacent linear portions in a sheet can include a uniform or substantially uniform angle between adjacent linear portions, or one or more different angles between different sets of adjacent linear portions.

In some embodiments, one or more scores that define the shape of a section in an array are full length from the beginning of a side of a section to the terminus of the side of the section and define an entire side of a section. In some embodiments, one or more or all scores that define the shape of a section in an array are not full length, not from the beginning of a side of a section to the terminus of the side of the section and do not define an entire side. A score that is not full length is referred to as "partial length." A side of a section can have one, two or more partial length scores.

A partial length score can abut the end of a side or be located between the ends of a side. Sides with partial length scoring have a break portion or gap in the scoring in which there is no score or a partial score. A break or gap in scoring can be at the end of a side or in between the ends of a side. In some embodiments, breaks or gaps have the thickness of a sheet intact or partially intact and connect sections. The breaks or gaps in scoring provide links between adjacent sections.

Break portions that are located at the terminus of a side and that are at corners of adjacent sections define corner links. Break portions that are not located at the ends of a side define side links between adjacent sections.

In some embodiments, a score in an array has a length, measured from one score terminus to an opposite score terminus, of about 0.1 millimeter to about 2.0 centimeters; about 0.2 millimeters to about 1.5 centimeters; about 0.4 millimeters to about 1.0 centimeter; about 0.5 millimeters to about 0.5 centimeters; about 1.0 millimeter to about 0.2 centimeters (e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 5, 10 or 20 millimeters).

In some embodiments, one or more, a portion of, or all scores in an array traverse the sheet thickness (i.e., penetrate the entire sheet thickness from one side of the sheet to the other side of the sheet). In certain embodiments, one or more, a portion of, or all scores in an array partially traverse the sheet thickness (e.g., penetrate about 20% to about 90% of the sheet thickness (e.g., about 30%, 40%, 50%, 60%, 70%, 80% of the sheet thickness)). In some embodiments, one or more portions of an array are not scored and the thickness of a sheet in these portions remains intact. In some embodiments, all or substantially all of the scores penetrate the entire thickness of a sheet.

In certain embodiments, sheets are scored (partial length) such that adjacent sections remain attached to each other by one or more links between adjacent sections. Links can be located at a corner of adjacent sections (corner links) or on a side of adjacent sections that is not at a corner (side links). In some embodiments a side link is in the middle of a side of adjacent sections. There can be multiple side links on an adjacent side of two sections. The links provide integrity to a sheet so that sections defined by scores that penetrate a sheet remain attached to one another as a unit (i.e., sheet) until they are separated by an animal. The links also facilitate separation of sections by an animal as they are a sized to be easily torn by an animal. The number of links between sections represents the minimum number of links required to maintain the integrity of a sheet of scored sections, but not impede the separation of sections by an animal. A link can be a corner link or a side link. The number of links between sides of adjacent sections can be from 1 link to about 6 links; about 2 links to about 4 links; about 2 links to about 3 links (e.g., 1, 2, 3, 4, 5 or 6 links). In some embodiments, a side of adjacent sections has two corner links. In some embodiments, a side of adjacent sections has one side link. In some embodiments, a side of adjacent sections has two corner links and a side link. In some embodiments, a side of adjacent sections has one corner link and one side link. In some embodiments, there are about 1 to about 12 links for each section; about 2 links to about 10 links; about 3 links to about 8 links; about 4 links to about 7 links (e.g., about 1, 2, 3, 4, 5, 6, 7, 8, 9, 10, 11 or 12 links). Different combinations of numbers and distribution of corner and side links are possible as long as the links maintain the integrity of a sheet while allowing the sections to be separated by an animal. In some embodiments adjacent sections can have a different number and combination of links.

A link sometimes has a uniform or substantially uniform width (for the latter, the width may deviate by 10% or less for a section). The widths of each of the links for sections in a sheet sometimes are the same or substantially the same. In certain embodiments, a link has a maximum width of about 0.01 millimeters to about 0.15 millimeters; about 002 millimeters to about 0.10 millimeters; about 0.04 millimeters to about 0.07 millimeters; 0.05 millimeters to about 0.06 millimeters (e.g., about 0.01, 0.02, 0.03, 0.04, 0.05, 0.06, 0.07, 0.08, 0.09, 0.10, 0.11, 0.12, 013, 0.14 or 0.15 millimeters).

Sheets are sometimes scored such that adjacent sections share a stippled portion. This scoring pattern can also maintain the integrity of a sheet of scored sections while facilitating separation of sections by an animal.

A sheet sometimes includes one or more solid panels within an array or sub-array of strips or sections. A solid panel can be located in any suitable location of a sheet so long as a contained animal can remove the solid panel from the sheet, with or without one or more strips or borders, and optionally use it for building a nest. A solid panel sometimes is located in the center of an array or sub-array. A solid panel can be of any suitable dimensions. In some embodiments, a solid panel is larger than the sections of a sheet that are scored to define sections that can be separated by an animal and used as bedding material. A solid panel often is of a size, and is in a location, that permits a contained animal to incorporate the solid panel into a nest structure after it is removed from a sheet, and/or permits a contained animal to remove the solid panel from a sheet independently from strips or sections also removed from the sheet. In certain embodiments, a sheet includes two or more solid panels, where two or more of the solid panels are of the same or substantially the same shape, the same or substantially the same dimensions, different shape, different dimensions, or combination thereof. One or more solid panels in a sheet may include text directly printed or imprinted thereon (e.g., a logo), and sometimes a solid panel in a sheet includes another component affixed thereon (e.g., a decal or label). A solid panel often is located within a flat or substantially flat array, or flat or substantially flat sub-array, of strips in a sheet, and often is of the same sheet material as the strips. A solid panel perimeter often is defined by breaks in a subset of discontinuous scores in a sheet, and often is a portion of a sheet not scored in a manufacturing process used to manufacture sheets described herein.

A sheet, in some embodiments, includes a tab extending from a side of the sheet. A tab often is of a size, and is in a location on a sheet, suitable for a human or robotic user to grip the sheet and position the sheet or group of sheets in a cage bottom.

A sheet can be manufactured from any material or materials suitable for use in an animal containment environment. A sheet often is manufactured from a material that can be sterilized. A sheet can be manufactured from a material that has a suitable weight, strength (e.g., tearing resistance or enhancement), texture and/or sheen that permits an animal to tear strips from the sheet or remove sections from the sheet. A sheet sometimes is manufactured from a pulp (e.g., paper pulp) and/or fiber (e.g., cotton, polymer, carbon). A sheet sometimes is a paper sheet, and sometimes is a sheet manufactured from virgin paper pulp. A sheet may be of any suitable color for animal containment, and sometimes is white, off-white, beige or brown in color. A sheet can be of any suitable weight for use in an animal containment environment, and sometimes one sheet in an enrichment composition weighs about 0.5 grams to about 100 grams; about 1 grams to about 75 grams; about 2 grams to about 50 grams; about 3 grams to about 25 grams, about 5 grams to about 10 grams; about 2 grams to about 6 grams; about 3 grams to about 5 grams; about 6 to about 8 grams (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 grams).

A sheet can be of any thickness for use in an animal containment environment, and sometimes one sheet in an enrichment composition has a thickness of about 0.0005 centimeters to about 0.50 centimeters; about 0.0010 centimeters to about 0.10 centimeters; about 0.0020 centimeters to about 0.05 centimeters; about 0.005 centimeters to about 0.01 centimeters; about 0.006 cm to about 0.009 centimeters (e.g., about 0.0005, 00006, 0.0007, 0.0008, 00009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.10, 0.20, 0.30, 0.40 or 0.50 centimeters).

An animal containment enrichment composition utilized in one cage can include any suitable number of sheets. In some embodiments, an animal containment enrichment composition for use in one cage contains one sheet or two or more sheets (e.g., includes 2 sheets to about 10 sheets; 2 sheets to 6 sheets; 2 sheets to 5 sheets; 3 sheets to 5 sheets; 3 sheets; 4 sheets; 5 sheets). For embodiments in which a composition includes two or more sheets, the sheets sometimes are identical or substantially identical, and sometimes one or more or all of the sheets are different (e.g., different weight, different dimensions, different shape, different scoring patterns, different strip patterns, different section patterns, different numbers and types of sub-arrays, the like or combination thereof). For embodiments in which an enrichment composition includes multiple sheets, the sheets sometimes are provided in a stacked or substantially stacked arrangement.

In certain embodiments, an animal containment enrichment composition includes one or more sheets that provide enrichment and nesting material (i.e., scored in a strip pattern) and one or more sheets that provide enrichment and bedding material (i.e., scored in a section pattern) for use in one cage. The different type of sheets need not be stacked in any particular arrangement in order for an animal to modify the sheets for their intended use. An animal in a cage containing the differently scored sheets will separate strips from the sheets scored as strips and use this material for nesting. The animal will separate sections from the sheet scored as sections and use this material for bedding.

For embodiments in which a composition includes two or more sheets, one or more or all of the sheets sometimes are not connected, and sometimes one or more or all of the sheets are connected. Sheets can be connected in one or more locations, sometimes one side of a sheet is connected to a side of another sheet, and sometimes one or more portions of a side of a sheet are connected to one or more portions of a side of another sheet. A connection sometimes is at a junction between two sheet sides that is not included in a cut that separates sheet perimeters.

Stated another way, one or more connections sometimes are portions of a seam between two sheet sides that remain after other portions of the seam are cut to separate the two sheets. Any suitable number of connections between sheets may be included (e.g., 1 to about 50 connections; 2 to about 10 connections; 2 to about 6 connections; about 1, 2, 3, 4, 5, 6, 7, 8, 9 or 10 connections between two sheets). Two or more or all connections between two sheets may be the same or substantially the same length, may be of different lengths, and may be of any suitable length (e.g., about 1 to about 10 millimeters in length (e.g., about 2, 3, 4, 5, 6, 7, 8, 9 millimeters in length)). In certain embodiments, two sheets in a composition are connected, and two or more portions of a side of a sheet are connected to two or more portions of a side of another sheet. Connections sometimes are between two sheets and multiple two-sheet units sometimes are utilized in an enrichment composition (e.g., 2, 3, 4, 5, or 6 two-sheet units). Connections sometimes are between more than two sheets and sometimes the sheets are arranged in an accordion arrangement in an enrichment composition. Sheets sometimes are provided individually (single sheets), sometimes are provided as a unit of two or more sheets for one cage, and sometimes are provided as a unit of multiple sheets for multiple cages (e.g., provided in a ream).

An animal containment enrichment composition can include, and a sheet can include, any suitable number of strips. A sheet sometimes includes about 30 to about 100 strips, about 40 to about 80 strips, about 50 to about 70 strips, about 60 to about 80 strips, about 60 to about 70 strips, about 70 to about 80 strips, or about 55, 56, 57, 58, 59, 60, 61, 62, 63, 64, 65, 66, 67, 68, 69, 70, 71, 72, 73, 74, 75, 76, 77, 78, 79 or 80 strips in certain embodiments. An animal containment composition sometimes includes multiple sheets, which in total can include about 100 to about 500 strips, about 200 to about 350 strips, about 240 strips to about 280 strips, or about 280 strips to about 320 strips, in some embodiments.

An animal containment enrichment composition can include, and a sheet can include, any suitable number of sections; about 100 sections to about 10,000 sections; about 500 sections to about 5000 sections; about 750 sections to about 2500 sections; about 1000 sections to about 2000 sections (e.g., about, 100, 200, 300, 400, 500, 600, 700, 800, 900, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500 or 10,000 sections). In certain embodiments, the number of sections in a sheet is about 1060. The size of the sections in a sheet and the number of sections in a sheet may depend on the particular bedding characteristics required for a specific animal species.

An animal containment composition sometimes includes multiple sheets, which in total can include about 100 sections to about 10,000 sections; about 500 sections to about 5000 sections; about 750 sections to about 2500 sections; about 1000 sections to about 2000 sections (e.g., about, 100, 200, 300, 400, 500, 600, 700, 800, 900, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500 or 10,000 sections).

The number of sheets and the number of sections in a sheet are generally a number that is sufficient to provide a required depth of bedding material in a cage when individual sections or individual sections and small groups of sections are considered. In some embodiments, the number of sheets is sufficient to provide a depth of bedding material that is about 0.1 centimeters to about 5 centimeters; about 0.5 centimeters to about 4 centimeters; about 1.0 centimeters to about 3 centimeters; about 2.0 centimeters to about 3.0 centimeters (e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 centimeters). In some embodiments, the number of sheets is sufficient for a volume of bedding material in a cage that is about 100 cm$^3$ to about 1000 cm$^3$; about 200 cm$^3$ to about 800 cm$^3$; about 300 cm$^3$ to about 500 cm$^3$; about 400 cm$^3$ to about 500 cm$^3$ (e.g., 100, 150, 200, 250, 300, 350, 400, 450, 500, 550, 600, 650, 700, 750, 800, 850, 900, 950 or 1000 cm$^3$). In certain embodiments, the amount of bedding material provided per cage is about 450 cm$^3$.

In certain embodiments, an animal containment enrichment composition includes a sheet 100 as illustrated in FIG. 1. A sheet sometimes includes one or more contours along its perimeter, and can include one or more contours as shown in sheet 100. A sheet can include edge 190 along side B, edge 195 along side C, perimeter portion 106 along side B and perimeter portion 116 along side C. Perimeter portion 105 on the side opposite side B can be parallel to perimeter portion 106 and perimeter portion 115 on the side opposite side C can be parallel to perimeter portion 116. Perimeter portions 120 and 121 can be at an angle with respect to perimeter portions 110 and 115, thereby offsetting perimeter portions 110 and 115 with respect to one another. Angles of perimeter portions 120 and 121 with respect to portions 110, 111 and 115, and angles of perimeter portions 125 and 130 with respect to perimeter portions 105, 106, 110 and 111, can be any angle suitable for fitment of a sheet in a cage base. Angles selected often permit perimeter contours of a sheet to follow contours of a cage base bottom. Perimeter portions 110 and 115 can be parallel to one another, and perimeter portions 120 and 130, for example, often are independently at an angle of about 100 degrees to about 170 degrees (e.g., about 125 degrees to about 145 degrees; about 135 degrees) with respect to perimeter portion 110. Angles for perimeter portions 121 and 125 with respect to perimeter portion 111 sometimes are the same as the foregoing angles described for perimeter portions 110, 115, 120 and 130. In certain embodiments not shown in the drawings herein, a sheet can include no contours along one or more sides, may include a continuously linear side B, a continuously linear side C, and/or can include continuously linear sides opposite to sides B and C.

A sheet often includes an array of scores, which can include continuous zig-zag scores 161, 162 as shown in FIG. 1 and FIG. 2, in some embodiments. Score 161 spans score termini 168 and 169 as illustrated in FIG. 1. Scores can include linear portions 165 and 166 that are at an angle with respect to one another (e.g., an angle of about 70 degrees to about 110 degrees; a angle of about 90 degrees), and the linear portions can converge at a pointed apex 167. Scores in an array or sub-array generally define strips in a flat array of strips or flat sub-array of strips, respectively, and zig-zag shaped strips 150 and 155 are shown by way of example in sheet 100 in FIG. 1 and FIG. 2.

A sheet also can include borders, such as borders 140 and 160, for example. The interior perimeter of border 140 can be defined by a terminal score in the array of scores. The interior perimeter of border 160 can be defined by counter-scores 170 that are angled and continuous with scores in the array, as shown in FIG. 2. In alternative embodiments, one or more counter-scores present in a sheet may be non-continuous with an associated score, and sometimes one or more or all scores in an array or sub-array are not in association with a counter-score (e.g., one or more or all scores have no contiguous counter-score counterparts; a sheet sometimes contains no counter-scores).

As illustrated in FIG. 1, a sheet may include a tab 135 that can serve as a manipulation point that can be utilized by a containment facility operator. A sheet also may include a solid panel 145 on which test (e.g., a logo) may be optionally printed or embossed. A sheet in certain embodiments may include two or more solid panels as described herein.

FIG. 3 shows a bottom view of sheet 100. One or more scores in an array may penetrate the thickness of a sheet, and sometimes all scores in an array penetrate the thickness of a sheet as shown in FIG. 3. Elements shown in FIG. 1 pertain to FIG. 3.

In some embodiments, a sheet includes an array of scores having the same general shape, as illustrated in FIG. 1. An array in such embodiments may include strips of the same width or strips of different widths. In an embodiment, sheet 100 in FIG. 1 includes strips having two widths in an array, where strips of a first width alternate repetitively with strips of a second width in the array.

In certain embodiments, a sheet includes one or more sub-arrays of scores where at least one of the sub-arrays has scores that differ in shape compared to scores in at least one other sub-array in the sheet. An embodiment containing three sub-arrays (i.e., sub-arrays F, G and H), each having different strip and score patterns, is illustrated as sheet 300 in FIG. 9. A sheet can include contours on one or more or all sides (e.g., side D, side E, side parallel to side D and/or side parallel to side E), and sometimes includes contours formed by angled sheet perimeter portions (e.g., perimeter portions 305, 325, 311, 321, 315, 320, 310, 330). Examples of suitable angles and offsets for perimeter portions forming sheet contours are described herein. In some embodiments, a sheet includes no perimeter contours.

A sheet having two or more sub-arrays can include any suitable combination of score and strip patterns among the sub-arrays. Sheet 300 in FIG. 9, for example, illustrates an embodiment of a sheet having three sub-arrays, with each sub-array having a different score and strip pattern. Sub-array F includes v-shaped zig-zag scores (e.g., 365, 366) extending from one score terminus 368 to an opposite score terminus 369. Scores in sub-array F are discontinuous, include a break (e.g., 364), generally define zig-zag strips (e.g., 350, 355) having multiple apexes (e.g., 367), and are in association with contiguous counter-scores (e.g., 370). A terminal score in sub-array F in general defines an interior perimeter of border 341 and counter-scores in sub-array F in general define an interior perimeter of border 360. Sub-array G includes discontinuous arch-shaped scores (e.g., 394, 396) that include a break (e.g., 397), generally define arch-shaped strips (e.g., 390, 395), and are in association with contiguous counter-scores (e.g., 398). Sub-array H includes discontinuous s-shaped scores (e.g., 384, 386) that include a break (e.g., 387), generally define s-shaped strips (e.g., 380, 385), and are in association with contiguous counter-scores (e.g., 388). A terminal score in sub-array H in general defines an interior perimeter of border 340 and counter-scores in sub-array H in general define an interior perimeter of border 361.

In certain embodiments, a sheet can include scores in an array defining repeated geometric shapes. FIG. 10 shows an embodiment of a sheet (400) with scores (405) that define sections shaped as hexagons (403). A sheet may have partial sections (404) at the perimeter (401) of a sheet if the array of sections does not match or fill the size of a sheet so that all sections are complete sections. A sheet may have a solid panel (402).

Figure 11:
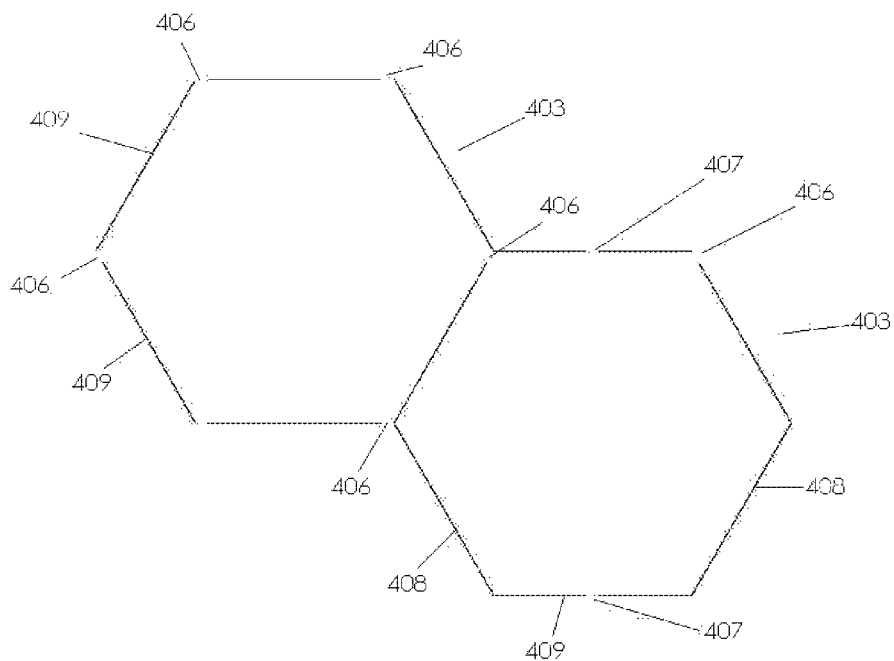
FIG. 11 is a top view of the sheet shown in FIG. 10 displaying two adjacent sections with different types of scoring and with a link between the two sections.

FIG. 11 shows two adjacent sections (403) from the sheet of FIG. 10. Sides of adjacent sections can be defined by full length scores (408) and partial length scores (409). Links between sections (403) can be corner links (406) and/or side links (407).

An animal containment enrichment composition can include one or more sheets, and FIG. 6 shows an embodiment that includes four separate sheets 100, 101, 102 and 103. An enrichment composition containing multiple sheets that include one or more connections between two or more of the sheets, as described herein, sometimes is provided and/or utilized. Referring to sheet 100 in FIG. 1, two sheets can, in some embodiments, include six connections each about 2 millimeters to about 8 millimeters long (e.g., about 5 millimeters long) at the following positions (i) at about the junction between perimeter portion 125 and 111; (ii) at about the junction between perimeter portion 121 and 111; (iii) at about the midpoint between (i) and (ii); (iv) at about the junction between perimeter portion 130 and 110; (v) at about the junction between perimeter portion 120 and 110; and (vi) at about the midpoint between (iv) and (v). In certain embodiments, the connections are portions of a seam between two sheet sides that remain after other portions of the seam are cut to separate the two sheets.

Additional Enrichment Composition Components

An animal containment enrichment composition sometimes includes only one or more sheets described herein. In some embodiments, an animal containment enrichment composition includes one or more non-sheet components in addition to the one or more sheets described herein. An animal containment enrichment composition can include one or more fiber pads (e.g., a cotton fiber pad) in certain embodiments, and sometimes a fiber pad is located beneath one or more sheets in an enrichment composition. In some embodiments, an animal containment enrichment composition includes a plurality of fiber rolls (e.g., relatively small paper rolls that can be unfurled by contained animals), and sometimes one or more sheets are arranged underneath the rolls in an enrichment composition. In certain embodiments, an animal containment enrichment composition includes one or more components constructed from felt, cotton, flax/linen, or other fibrous material in addition to a sheet or sheets described herein.

Animal Containment System Components that Include Enrichment Compositions

An animal containment system can include a suitable number of components for containing animals. Non-limiting examples of animal containment system components include one or more of a cage base, a cage lid, a cage feeding tray, a cage water bottle, a cage water emitter, a cage lid filter, a rack configured to store cages and a blower. A rack sometimes is a ventilated rack configured to ventilate cages in association with the rack. A rack can ventilate cages by directing air from (i) a central air handling unit for a building or portion of a building in which the rack resides, (ii) one or more blowers mounted on the rack or are in proximity with a rack, and (iii) a combination of (i) and (ii), for example. Non-limiting examples of animal containment system components are described in International Application No. PCT/US2011/055650 filed on Oct. 10, 2011 and published as WO 2012/051124 on Apr. 19, 2012; International Application No. PCT/US2009/063638 filed on Nov. 6, 2009 and published as WO 2010/054257 on May 14, 2010; International Application No. PCT/US2007/018255 filed on Aug. 17, 2007 and published as WO 2008/021492 on Feb. 21, 2008; International Application No. PCT/US2006/023038 filed on Jun. 13, 2006 and published as WO 2006/138323 on Dec. 28, 2006; and International Application No. PCT/US2005/044977 filed on Dec. 13, 2005 and published as WO 2006/065773 on Jun. 22, 2006.

In certain embodiments, an animal containment enrichment composition described herein is in association with a cage base, and often an enrichment composition is in contact with the bottom of a cage base. A sheet in an enrichment composition in contact with a cage base bottom sometimes covers a substantial portion of the cage base bottom, and sometimes the surface area of the sheet covers about 55% to about 100% of the surface area of the cage base bottom (e.g., the surface area of the sheet is about 55%, 60%, 70%, 75%, 80%, 85%, 90%, or 95% or more of the surface area of the cage bottom). In some embodiments, one or more or all sides of a sheet in an enrichment composition have a shape that follows a contour of a cage base bottom.

A cage base that comprises an enrichment composition (nesting composition and/or bedding composition) sometimes is provided as a member of a stacked, or nested, set of cage bases. Two or more or all of the cage bases in a nested set of cage bases can include an enrichment composition, and the enrichment compositions in the nested set of cage bases often are uniform or substantially uniform. For a first cage base nested above a second cage base in nested set of cage bases, there often is a gap between the outer surface of the first cage base bottom and an enrichment component in association with the bottom of the second cage base (e.g., a gap of about 1 millimeter to about 5 centimeters (e.g., a gap of about 0.5, 1, 1.5, 2, 2.5, 3, 3.5 or 4 centimeters). Two or more or all walls of cage bases in the nested set of cage bases often are at a non-perpendicular angle with respect to the cage base bottom to promote nesting efficiency (e.g., an angle of greater than 90 degrees with respect to the cage base bottom). Nesting cage bases can significantly reduce the volume of multiple cage bases as compared to the same number of un-nested cage bases, which is advantageous for shipping, storage before housing an animal, and storage after housing an animal, for example. Any convenient number of cage bases can be nested, including, but not limited to, 10 or more, 20 or more, 30 or more, 40 or more, 50 or more, 60 or more, 70 or more, 80 or more, 90 or more or 100 or more cage bases. The degree or efficiency of cage base nesting sometimes is expressed in terms of a percentage, which is the height or volume of the nested cage base within another cage base containing it, relative to the overall height or volume of the nested cage bases. Thus, the term "80% nested" indicates 80% of the volume or height of a nested cage base, for example, is contained within the base in which it is inserted. When stacked, cage bases often are 75% or more nested, sometimes 80% or more or 85% or more nested, and sometimes about 90% to about 95% nested. Such cage base nesting calculations often are performed when no components, other than an enrichment composition or compositions, are in the cage base (e.g., bedding material supplied as pieces at the bottom of the cage base).

A cage base often includes four walls and a bottom (e.g., substantially rectangular, substantially square, substantially pie-shaped). In certain embodiments, the walls and/or the bottom independently have a maximum thickness of about 0.01 inches to about 0.09 inches (e.g., a maximum thickness of about 0.01 inches to about 0.03 inches; a maximum thickness of about 0.01 inches to about 0.04 inches; a maximum thickness of about 0.01 inches to about 0.05 inches; a maximum thickness of about 0.01, 0.02, 0.03, 0.04, 0.05, 0.06, 0.07, 0.08, 0.09 inches). A cage base often is constructed from a polymer or polymer blend, and non-limiting examples of polymers include polypropylene (PP), high-density polyethylene, low-density polyethylene, polyethylene teraphthalate (PET), polyvinyl chloride (PVC), polyethylenefluoroethylene (PEFE), polystyrene (PS), high-density polystyrene, acrylonitrile butadiene styrene copolymers and the like. In certain embodiments, a cage is constructed from PET or PS (e.g., high density PS).

A cage base sometimes is in combination with a cage lid. In some embodiments, components of a cage lid have a maximum thickness of about 0.01 inches to about 0.09 inches (e.g., a maximum thickness of about 0.01 inches to about 0.03 inches; a maximum thickness of about 0.01 inches to about 0.04 inches; a maximum thickness of about 0.01 inches to about 0.05 inches; a maximum thickness of about 0.01, 0.02, 0.03, 0.04, 0.05, 0.06, 0.07, 0.08, 0.09 inches). A cage lid often is manufactured from a polymer or polymer blend.

A cage base in some embodiments includes a bedding material, which can be an animal containment enrichment composition as described above (provided as sheets with an array of sections that are separated by an animal)

The animal containment enrichment composition as described above that provides bedding material is in distinction to bedding material supplied as pieces (pre-separated). Non-limiting examples of bedding material that is supplied as pieces include a fibrous material, paper material, or vegetable material (e.g., corn cob bedding). Bedding supplied as pieces sometimes is positioned over an enrichment composition (nesting composition) in a cage base, and sometimes an enrichment composition is positioned over bedding supplied as pieces in a cage base.

In certain embodiments, a cage base includes one or more animals. A cage base can include any animal that can be contained in a cage base, and an animal sometimes is a laboratory animal or animal contained in a vivarium. An animal contained sometimes is transgenic, immunodeficient, inbred, contains one or more xenografts and/or lacks one or more functional genes (knock-out animal). An animal sometimes is chosen from a rodent, mouse (e.g., nude mouse or a severe combined immune deficiency (SCID) mouse), rat, hamster, gerbil, guinea pig, chinchilla or rabbit, for example.

A cage base sometimes is located in an animal containment system, and sometimes is disposed within a cage rack in the system. When disposed in a cage rack, a cage base often is in combination with a cage lid. An animal containment system sometimes is a ventilated containment system, and air can be ventilated by the rack to a cage base by a blower in association with the rack and/or a central air management system in certain embodiments.

FIG. 7 and FIG. 8 show particular embodiments of a cage base in combination with an enrichment composition. Cage base 200 includes sidewalls 210 and 215, and bottom 205. Cage base 200 also includes detent 220, sidewall-to-bottom transition 225 and detent-to-bottom transition 230. FIG. 8 shows a particular embodiment in which contours of sheets in an enrichment composition substantially match contours of the cage bottom. FIG. 8 also shows a substantial portion of the cage base bottom is covered by stacked sheets in the enrichment composition. Although sheets of an enrichment composition that provide bedding materials upon separation of sections by an animal are not illustrated, such sheets also can substantially match contours of the cage bottom and cover a substantial portion of the cage base bottom.

Methods for Manufacturing Enrichment Compositions

An animal containment enrichment composition described herein can be manufactured in a suitable manner known in the art. For example, a method known in the art for manufacturing and/or scoring paper products can be utilized for manufacturing sheets in enrichment compositions described herein. In certain embodiments, a press containing a die member that contains blades may be used to score sheets described herein. In some embodiments, a sheet in an enrichment composition is manufactured according a process that includes positioning a die comprising an array of blades in proximity with a surface of a solid sheet; and causing the array of blades of the die to penetrate the sheet; whereby the array of scores in the sheet is formed by the array of blades of the die. In such processes, the sheet sometimes is provided as a single sheet, and alternatively, the sheet sometimes is provided in a stack of sheets (e.g., a ream of sheets) and the array of blades of the die penetrates sheets in the stack. A die and blades can be manufactured from any suitable material for scoring or cutting a paper sheet or like sheet (e.g., metal, metal alloy, steel and the like). A die sometimes is utilized in conjunction with a press, and in some embodiments a die includes one or more of the following components: die block, punch plate, blank punch, pierce punch, stripper plate, pilot, guide, back gage, finger stop, setting (stop) block, blanking die and shank. In some embodiments, a die is positioned on a conveyance in an apparatus that moveably positions the die at different positions on a sheet to generate the array of scores in the sheet. In certain embodiments, multiple sheets described herein can be manufactured from one larger solid sheet using a die.

In certain embodiments, a sheet in an enrichment composition is manufactured according a process that includes positioning a heat source in proximity with a surface of a solid sheet; and causing the heat source to emit heat in an amount sufficient to penetrate the sheet at locations in the array of scores in the sheet. In such processes, the sheet sometimes is provided as a single sheet, and alternatively, the sheet sometimes is provided in a stack of sheets (e.g., a ream of sheets) and the heat emitted by the heat source penetrates sheets in the stack. Heat from a heat source can be directed to one or more points on a sheet. In certain embodiments, a heat source directs heat in a pattern on a sheet or sheets and generates the array of scores, or subset thereof. In some embodiments, a heat source is positioned on a conveyance in an apparatus that moveably positions the heat source at different positions on a sheet to generate the array of scores in the sheet. Any suitable heat source can be utilized, which sometimes is a laser heat source that emits laser energy sufficient to penetrate a sheet or sheets. In certain embodiments, multiple sheets described herein can be manufactured from one larger solid sheet using a heat source.

Use of Enrichment Compositions with Animal Containment Components

Animal enrichment compositions (nesting compositions and bedding compositions) described herein can be utilized in any suitable manner and often are utilized or manipulated in an animal containment system by a human or robotic operator. In certain embodiments, an enrichment composition or compositions are utilized in a process that includes affixing a cage lid to a cage base that contains an animal containment enrichment composition or compositions described herein, thereby providing an animal containment cage for animal containment. In such embodiments, the cage base often is constructed from a polymer, and often includes four walls and a bottom, where the walls and the bottom, in some embodiments, independently have a maximum thickness of about 0.01 inches to about 009 inches (described in greater detail above). The cage lid sometimes has a maximum thickness of about 0.01 inches to about 0.09 inches (described in greater detail above). The cage base sometimes includes a bedding material supplied as pieces and/or one or more animals. A process sometimes includes positioning the animal containment cage in a rack of an animal containment system, and sometimes the rack is ventilated.

A process sometimes includes transferring at least one of one or more animals from one cage to a second cage. Sometimes a process includes transferring one or more sheets or portions thereof from one cage to a second cage, and sometimes includes transferring one or more nests or portions thereof present in one cage to a second cage. Sometimes the process includes positioning an animal containment enrichment composition or compositions in the second cage prior to transferring at least one of the one or more animals to the second cage.

Different sheet designs can be utilized for different animals, and designs can be optimized for particular animals. For example, sheets that include different scoring patterns, different strip patterns, different shaped sections, different numbers of sub-arrays, different array sizes, different sized sections and different sheet sizes can be tested and optimized for different types of animals (e.g., one sheet design may be optimal for larger rodents and a different sheet design may be optimal for smaller rodents). Optimization can be carried out in any suitable manner known in the art. For example, a particular sheet design may be incorporated into an enrichment composition, the enrichment composition provided to a particular group or groups of animals, and the conduct of animals tearing strips and other features from the sheets (e.g., borders, solid panels, tabs) or removing and separating sections and/or using the strips or sections, can be assessed. In a particular example, nest quality can be assessed for determining a level of enrichment provided by a composition provided to contained animals (see, e.g., Gaskill, B. N., Karas, A. Z., Garner, J. P., Pritchett-Corning, K. R.; Nest Building as an Indicator of Health and Welfare in Laboratory Mice; J. Vis. Exp. (82), e51012, doi:10.3791/51012 (2013)). In a particular example, bedding quality can be assessed by evaluating airborne duct particle number and/or ammonia concentration in a cage (see, e.g., Miyamoto et al., J Am Assoc Lab Anim Sci. July 2009: 48(4): 405-411). Other types of animal behavior can be assessed as part of determining level of enrichment (e.g., repetitive behavior, aggression, breeding and the like). In certain embodiments, breeding performance and/or reproductive success can be monitored to determine level of enrichment and/or nesting according to methods known in the art (see, e.g., (i) Gaskill B N, Pritchett-Corning K R, Gordon C J, Pajor E A, Lucas J R, Davis J K, Garner J P; Energy reallocation to breeding performance through improved nest building in laboratory mice; PLoS One. 2013 Sep. 11; 8(9):e74153; doi: 10.1371/journal.pone.0074153; eCollection 2013; and (ii) Sarah E Hess, Stephanie Rohr, Brett D Dufour, Brianna N Gaskill, Edmond A Pajor, and Joseph P Garner; Home Improvement: C57BL/6J Mice Given More Naturalistic Nesting Materials Build Better Nests; J Am Assoc Lab Anim Sci. November 2008; 47(6): 25-31.)

Examples of Embodiments

Listed hereafter are non-limiting examples of certain embodiments of the technology.

A1. An animal containment enrichment composition, comprising one or more sheets, wherein at least one of the one or more sheets comprises an array of scores defining a flat array of strips in the sheet.

A2. The animal containment enrichment composition of embodiment A1, wherein the array of scores is configured for an animal to remove strips in the array of strips from the sheet.

A2.1. The animal containment enrichment composition of embodiment A2, wherein the strips are suitable for building a nest by the animal.

A3. The animal containment enrichment composition of any one of embodiments A1, A2 and A2.1, wherein the shape of each of the strips in the array of strips is the same in the sheet.

A4. The animal containment enrichment composition of embodiment A1 or A2, wherein the shape of two or more strips in the array of strips is different in the sheet.

A5. The animal containment enrichment composition of embodiment A4, wherein strips having a first shape are grouped in a first sub-array of strips in the sheet and strips having a second shape are grouped in a second sub-array of strips in the sheet.

A6. The animal containment enrichment composition of embodiment A5, wherein strips having a third shape are grouped in a third sub-array of strips in the sheet.

A7. The animal containment enrichment composition of any one of embodiments A3 to A6, wherein the shape of one or more strips in the array of strips is chosen from linear, curved, s-shaped, sinusoidal, arch-shaped, v-shaped, w-shaped, zig-zag, and spiral-shaped.

A8. The animal containment enrichment composition of any one of embodiments A1 to A7, wherein scores defining opposite perimeters of a strip comprise linear scores.

A9. The animal containment enrichment composition of embodiment A8, wherein the linear scores are parallel.

A10. The animal containment enrichment composition of any one of embodiments A1 to A9, wherein a width of each of the strips in the array of strips or a sub-array of strips is the same in the sheet.

A11. The animal containment enrichment composition of any one of embodiments A1 to A10, wherein two or more strips in the array of strips or a sub-array of strips have widths that are different in the sheet.

A12. The animal containment enrichment composition of any one of embodiments A1 to A11, wherein one or more scores are continuous from the terminus on one side of the sheet to the terminus on an opposing side of the sheet.

A13. The animal containment enrichment composition of any one of embodiments A1 to A11, wherein one or more scores are not continuous from the terminus on one side of the sheet to the terminus on an opposing side of the sheet.

A14. The animal containment enrichment composition of any one of embodiments A1 to A13, wherein one or more scores traverse the sheet thickness.

A15. The animal containment enrichment composition of any one of embodiments A1 to A14, wherein one or more scores comprise, or are adjacent to, a counter-score.

A16. The animal containment enrichment composition of any one of embodiments A1 to A15, wherein the sheet comprises a solid and continuous border along the sheet perimeter.

A17. The animal containment enrichment composition of any one of embodiments A1 to A16, wherein the sheet comprises one or more solid panels within the array of strips.

A18. The animal containment enrichment composition of any one of embodiments A1 to A17, wherein the sheet comprises a tab extending from a side of the sheet.

A19. The animal containment enrichment composition of any one of embodiments A1 to A18, wherein the sheet is a paper sheet.

A20. The animal containment enrichment composition of embodiment A19, wherein the sheet comprises virgin paper pulp.

A21. The animal containment enrichment composition of any one of embodiments A1 to A20, wherein the sheet weighs about 0.5 grams to about 20 grams.

A22. The animal containment enrichment composition of any one of embodiments A1 to A21, comprising one sheet.

A22. The animal containment enrichment composition of any one of embodiments A1 to A21, comprising two or more sheets.

A23. The animal containment enrichment composition of embodiment A22, comprising two to ten sheets.

A23. The animal containment enrichment composition of embodiment A23, comprising two to six sheets.

A24. The animal containment enrichment composition of embodiment A22, comprising four sheets.

A25. The animal containment enrichment composition of any one of embodiments A22 to A24, wherein two or more of the sheets are connected.

A26. The animal containment enrichment composition of any one of embodiments A22 to A24, wherein two or more of the sheets are not connected.

A27. The animal containment enrichment composition of any one of embodiments A1 to A26, comprising a fiber pad.

A28. The animal containment enrichment composition of any one of embodiments A1 to A27, comprising a plurality of fiber rolls.

A100. An animal containment enrichment composition, comprising one or more sheets, wherein at least one of the one or more sheets comprises an array of scores defining a flat array of sections of the sheet.

A101. The animal containment enrichment composition of embodiment A100, wherein the array of scores is configured for an animal to remove and separate the sections in the array of sections from the sheet.

A101.1. The animal containment enrichment composition of embodiment A101, wherein the array of scores are full length scores and partial length scores.

A102. The animal containment enrichment composition of embodiment A101, wherein a plurality of sections when separated are suitable as bedding for an animal or animals.

A102.1. The animal containment enrichment composition of any one of embodiments A100 to A102, wherein the sections are repeated in a sheet.

A102.2. The animal containment enrichment composition of any one of embodiments A100 to A102.1, wherein there are at least 500 sections in a sheet.

A102.3. The animal containment enrichment composition of any one of embodiments A100 to A102.1, wherein there are at least 1000 sections in a sheet.

A103. The animal containment enrichment composition of any one of embodiments A100 to A102.3, wherein the sections are geometric shapes.

A104. The animal containment enrichment composition of embodiment A103, wherein the geometric shapes are chosen from a triangle, a rectangle, a square, a pentagon, a parallelogram, a hexagon or an octagon.

A104.1 The animal containment enrichment composition of embodiment A104, wherein the geometric shapes are hexagons.

A105. The animal containment enrichment composition of any one of embodiments A100, A104, wherein the shape of the sections in the array are the same in the sheet.

A106. The animal containment enrichment composition of any one of embodiments A100 to A104, wherein the shape of two or more of the sections in an array are different in the sheet.

A107. The animal containment enrichment composition of any one of embodiments A100 to A106, wherein the dimensions of each of the sections in an array of sections is the same.

A108. The animal containment enrichment composition of any one of embodiments A100 to A106, wherein two or more sections in an array of sections have dimensions that are different.

A109 The animal containment enrichment composition of any one of embodiments A100 to A108, wherein the scores penetrate the entire thickness of a sheet.

A110. The animal containment enrichment composition of any one of embodiments A100 to A109, wherein the scores are partial length scores.

A110.1. The animal containment enrichment composition of embodiment A110, wherein the partial length scores provide links between adjacent sections of a sheet.

A110.2 The animal containment enrichment composition of embodiment A110.1, wherein the links are configured to be torn by an animal.

A110.3. The animal containment enrichment composition of embodiment A110.1 or A110.2, wherein the links are located at corners of adjacent sections.

A110.4. The animal containment enrichment composition of embodiment A110.1 or A110.2, wherein the links are not located at corners of adjacent sections.

A111. The animal containment bedding composition of any one of embodiments A100 to A110.4, wherein the sheet comprises one or more solid panels within the array of sections.

A112. The animal containment enrichment composition of any one of embodiments A100 to A111, wherein the sheet is a paper sheet.

A113. The animal containment enrichment composition of embodiment A112, wherein the sheet comprises virgin paper pulp.

A114. The animal containment enrichment composition of any one of embodiments A100 to A113, wherein the sheet weighs about 0.5 grams to about 100 grams.

A115. The animal containment enrichment composition of any one of embodiments A100 to A114, comprising one sheet.

A116. The animal containment enrichment composition of any one of embodiments A100 to A115, comprising two or more sheets.

A117. The animal containment enrichment composition of embodiment A116, comprising two to ten sheets.

A118. The animal containment enrichment composition of embodiment A117, comprising two to six sheets.

A119. The animal containment bedding composition of embodiment A118, comprising three to five sheets.

A120. The animal containment enrichment composition of any one of embodiments A116 to A119, wherein two or more of the sheets are connected.

A121. The animal containment enrichment composition of any one of embodiments A116 to A119, wherein two or more of the sheets are not connected.

A122. The animal containment enrichment composition of any one of embodiments A116 to A121, wherein the sections have an area of about 1 mm$^2$ to about 500 mm$^2$.

A123. The animal containment enrichment composition of any one of embodiments A116 to A122, wherein the sheets have a thickness of about 0.0005 centimeters to 0.50 centimeters.

B1. A cage base comprising an animal containment enrichment composition of any one of embodiments A1 to A28 and A100 to A123.

B1.1. The cage base of embodiment B1, wherein the animal containment enrichment composition is any one of embodiments A1 to A28.

B1.2. The cage base of embodiment B1, wherein the animal containment enrichment composition is any one of embodiments A100 to A123.

B1.2.1. The cage base of embodiment B1, wherein the animal containment enrichment composition is any one of embodiments A1 to A28 and one of any embodiments of A100 to A123.

B1.3 The cage base of any one of embodiments B1, B1.1 B1.2, and B1.2.1, wherein the cage base comprises a bottom and the animal containment enrichment composition is in contact with the bottom.

B1.4 The cage base of embodiment B1.3, wherein the animal containment enrichment composition covers a substantial portion of the cage bottom.

B2. The cage base of any one of embodiments B1 to B1.4, which is disposed within a nested set of cage bases.

B2.1. The cage base of embodiment B2, wherein the animal containment enrichment compositions in the cage bases of the nested set of cage bases are substantially uniform.

B3. The cage base of any one of embodiments B1 to B1.4, B2 and B2.1, wherein the cage base comprises four walls and a bottom, and the walls and the bottom have a maximum thickness of about 0.01 inches to about 0.09 inches.

B4. The cage base of embodiment B3, wherein the cage base is constructed from a polymer.

B5. The cage base of any one of embodiments B1 to B1.4, B3 and B4, in combination with a cage lid.

B6. The cage base of embodiment B5, wherein the cage lid has a maximum thickness of about 0.01 inches to about 0.09 inches.

B7. The cage base of embodiment 81.2, comprising a bedding material.

B8. The cage base of any one of embodiments B1 to B1.4 and B3 to B7, comprising one or more animals.

B9. An animal containment system, comprising a cage base of any one of embodiments B1 to B1.4 and B3 to B8, disposed within a rack.

B10. The animal containment system of embodiment B9, which is a ventilated containment system.

C1. A method for manufacturing an animal containment enrichment composition of any one of embodiments A1 to A28 and A100 to A123, comprising:
positioning a die comprising an array of blades in proximity with a surface of a solid sheet; and
causing the array of blades of the die to penetrate the sheet; whereby the array of scores in the sheet is formed by the array of blades of the die.

C2. The method of embodiment C1, wherein the sheet is provided as a single sheet.

C3. The method of embodiment C1, wherein the sheet is provided in a ream of sheets, and the array of blades of the die penetrates the sheets in the ream.

C4. A method for manufacturing an animal containment enrichment composition of any one of embodiments A1 to A28 and A100 to A123, comprising:
positioning a heat source in proximity with a surface of a solid sheet; and
causing the heat source to emit heat in an amount sufficient to penetrate the sheet at locations in the array of scores in the sheet.

C5. The method of embodiment C4, wherein the heat source is a laser heat source.

C6. The method of embodiment C4 or C5, wherein the sheet is provided as a single sheet.

C7. The method of embodiment 06, wherein the sheet is provided in a ream of sheets, and heat from the heat source penetrates the sheets in the ream.

C8. The method of embodiment C7, wherein the heat source is positioned on a conveyance in an apparatus configured to moveably position the heat source at different positions on a sheet to generate the array of scores in the sheet.

D1. A method for preparing or maintaining a cage for animal containment, comprising: affixing a cage lid to a cage base comprising an animal containment enrichment composition of any one of embodiments A1 to A28 and A100 to A123, thereby providing an animal containment cage for animal containment.

D1.1. The method of embodiment D1, wherein the animal containment enrichment composition is any one of embodiments A1 to A28.

D1.2. The method of embodiment D1, wherein the animal containment enrichment composition is any one of embodiments A100 to A123.

D1.3. The method of embodiment D1, wherein the animal containment enrichment composition has any one of embodiments A1 to A28 and any one of embodiments A100 to A123.

D2. The method of any one of embodiments D1 to D1.3, wherein the cage base comprises four walls and a bottom, and the walls and the bottom have a maximum thickness of about 0.01 inches to about 0.09 inches.

D3. The method of any one of embodiments D1 to D1.3 and D2, wherein the cage base is constructed from a polymer.

D4. The method of any one of embodiments D1 to D3, wherein the cage lid has a maximum thickness of about 0.01 inches to about 0.09 inches.

D5. The method of embodiment D1.2, wherein the animal containment enrichment composition comprises a bedding material.

D5.1. The method of embodiment D1.1, wherein the animal containment enrichment composition comprises a nesting material.

D5.2. The method of any one of embodiments D1 to D1.4, D2, D3 and D4, wherein the animal containment cage enrichment composition comprises at least one sheet comprising an array of scores defining a flat array of strips in the sheet and at least one sheet comprising an array of scores defining a flat array of sections of the sheet.

D6. The method of any one of embodiments D1 to D5.2, wherein the cage comprises one or more animals.

D7. The method of any one of embodiments D1 to D6, comprising positioning the animal containment cage in a rack of an animal containment system.

D8. The method of embodiment D7, wherein the rack is ventilated.

D9. The method of any one of embodiments D6 to D8, comprising transferring at least one of the one or more animals from the cage to a second cage.

D10. The method of embodiment D9, comprising transferring one or more sheets or portions thereof from the cage to the second cage.

D11. The method of embodiment D9 or D10, comprising transferring one or more nests or portions thereof present in the cage to the second cage.

D12. The method of any one of embodiments D9 to D11, wherein the second cage is provided with an animal containment enrichment composition of any one of embodiments A1 to A28 and any one of embodiments A100 to A122 prior to transferring the at least one of the one or more animals.

D13. The method of embodiment D1.2, wherein the animal containment enrichment composition when separated into sections provides bedding material for an animal or animals in a cage.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. An animal containment enrichment composition, comprising one or more sheets,
   wherein at least one of the one or more sheets comprise an array of discontinuous scores comprising cuts that traverse a sheet thickness, counter-scores, wherein one or more scores are contiguous with, or adjacent to, a counter-score and breaks comprising a partial score or no score, which define a substantially flat array of a plurality of strips of uniform or substantially uniform width of about 0.5 millimeters to about 30 millimeters, each strip having a shape chosen from curved, s-shaped, sinusoidal, arch-shaped, v-shaped, w-shaped, zig-zag, or spiral-shaped,
   wherein at least one of the one or more sheets comprise a detachable solid and continuous border along a sheet perimeter, wherein the border comprises an interior side and an exterior side, the exterior side is co-extensive with the perimeter, the interior side is associated with scores or counter-scores and the shape of the interior side is defined by the shape of the scores or counter-scores with which it is associated, wherein the scores, the counter-scores, and the breaks facilitate detachment by an animal of individual strips and/or multiple strips as a group of strips from a sheet.

2. The animal containment enrichment composition of claim 1, wherein the individual strips and/or multiple strips as a groups of strips are nest building material.

3. The animal containment enrichment composition of claim 1, wherein the shape of each of the strips in the array of strips is the same in a sheet.

4. The animal containment enrichment composition of claim 1, wherein the shape of two or more strips in the array of strips is different in a sheet.

5. The animal containment enrichment composition of claim 4, wherein strips having a first shape are grouped in a first sub-array of strips in the sheet and strips having a second shape are grouped in a second sub-array of strips in the sheet.

6. The animal containment enrichment composition of claim 1, wherein a sheet comprises one or more solid panels within the array of strips.

7. The animal containment enrichment composition of claim 1, wherein a sheet comprises a tab extending from a side of the sheet.

8. The animal containment enrichment composition of claim 1, wherein a sheet is a paper sheet.

9. The animal containment enrichment composition of claim 1, wherein a sheet weighs about 0.5 grams to about 20 grams.

10. The animal containment enrichment composition of claim 1, comprising two or more sheets and the sheets are connected.

11. The animal containment enrichment composition of claim 1, wherein detachment by an animal of individual strips and/or multiple strips as a group of strips from a sheet is animal enrichment.

12. The animal containment enrichment composition of claim 1, wherein the plurality of strips are of uniform or substantially uniform width of about 1.0 millimeters to about 5.0 millimeters.

13. The animal containment enrichment composition of claim 1, configured to cover a substantial portion of a rodent cage base bottom.

14. A cage base comprising an animal containment enrichment composition of claim 1.

15. The cage base of claim 14, wherein the cage base comprises a bottom and the animal containment enrichment composition is in contact with the bottom and covers a substantial portion of the cage bottom.

* * * * *